(12) United States Patent
McAlister

(10) Patent No.: US 8,192,852 B2
(45) Date of Patent: Jun. 5, 2012

(54) CERAMIC INSULATOR AND METHODS OF USE AND MANUFACTURE THEREOF

(75) Inventor: Roy E. McAlister, Phoenix, AZ (US)

(73) Assignee: McAlister Technologies, LLC, Phoenix, AZ (US)

( * ) Notice: Subject to any disclaimer, the term of this patent is extended or adjusted under 35 U.S.C. 154(b) by 0 days.

(21) Appl. No.: 12/841,135

(22) Filed: Jul. 21, 2010

(65) Prior Publication Data

US 2011/0048371 A1    Mar. 3, 2011

Related U.S. Application Data

(60) Continuation-in-part of application No. 12/581,825, filed on Oct. 19, 2009, which is a division of application No. 12/006,774, filed on Jan. 7, 2008, now Pat. No. 7,628,137, application No. 12/841,135, which is a continuation-in-part of application No. 12/653,085, filed on Dec. 7, 2009, which is a continuation-in-part of application No. 12/006,774, filed on Jan. 7, 2008, now Pat. No. 7,628,137, application No. 12/841,135, which is a continuation-in-part of application No. PCT/US2009/067044, filed on Dec. 7, 2009.

(60) Provisional application No. 61/237,425, filed on Aug. 27, 2009, provisional application No. 61/237,479, filed on Aug. 27, 2009, provisional application No. 61/237,466, filed on Aug. 27, 2009, provisional application No. 61/304,403, filed on Feb. 13, 2010, provisional application No. 61/312,100, filed on Mar. 9, 2010.

(51) Int. Cl.
*C04B 35/553* (2006.01)
*C04B 35/00* (2006.01)
*F02M 57/06* (2006.01)

(52) U.S. Cl. ........ 428/701; 428/702; 123/297; 501/151; 501/1

(58) Field of Classification Search ........................ None
See application file for complete search history.

(56) References Cited

U.S. PATENT DOCUMENTS 1,451,384 A    4/1923    Whyte
(Continued)

FOREIGN PATENT DOCUMENTS

DE    3443022 A1    5/1986
(Continued)

OTHER PUBLICATIONS

International Search Report and Written Opinion for Application No. PCT/US2011/024778 Applicant: McAlister Technologies, LLC.; Date of Mailing: Sep. 27, 2011 (10 pages).

(Continued)

*Primary Examiner* — Jennifer McNeil
*Assistant Examiner* — Vera Katz
(74) *Attorney, Agent, or Firm* — Perkins Coie LLP

(57) ABSTRACT

One embodiment of the present disclosure is directed to an insulator comprising a ceramic composition, wherein the ceramic composition comprises about 25-60% $SiO_2$; 15-35% $R_2O_3$, wherein the $R_2O_3$ is 3-15% $B_2O_3$ and 5-25% $Al_2O_3$; 4-25% MgO+0-7% $Li_2O$, wherein the total of MgO+$Li_2O$ is between about 6-25%; 2-20% $R_2O$, wherein the $R_2O$ is 0-15% $Na_2O$, 0-15% $K_2O$, 0-15% $Rb_2O$; 0-15% $Rb_2O$; 0-20% $Cs_2O$; and 4-20% F; crystalline grains, wherein the crystalline grains are substantially oriented to extend in a first direction to provide improved insulating properties in a direction perpendicular to the first direction, wherein the first direction is circumferential and the direction perpendicular to the first direction is radial; and a first zone and a second zone, wherein the first zone is in compression and the second zone is in tension.

12 Claims, 6 Drawing Sheets

U.S. PATENT DOCUMENTS

| | | |
|---|---|---|
| 2,441,277 A | 5/1948 | Lamphere |
| 2,721,100 A | 10/1955 | Bodine, Jr. |
| 3,243,335 A | 3/1966 | Faile |
| 3,520,961 A | 7/1970 | Suda et al. |
| 3,594,877 A | 7/1971 | Suda et al. |
| 3,608,050 A | 9/1971 | Carman et al. |
| 3,689,293 A | 9/1972 | Beall |
| 3,931,438 A | 1/1976 | Beall et al. |
| 3,960,995 A | 6/1976 | Kourkene |
| 3,976,039 A | 8/1976 | Henault |
| 3,997,352 A | 12/1976 | Beall |
| 4,020,803 A | 5/1977 | Thuren et al. |
| 4,066,046 A | 1/1978 | McAlister |
| 4,095,580 A | 6/1978 | Murray et al. |
| 4,105,004 A | 8/1978 | Asai et al. |
| 4,122,816 A | 10/1978 | Fitzgerald et al. |
| 4,135,481 A | 1/1979 | Resler, Jr. |
| 4,172,921 A * | 10/1979 | Kiefer ............................ 428/410 |
| 4,183,467 A | 1/1980 | Sheraton et al. |
| 4,203,393 A | 5/1980 | Giardini |
| 4,293,188 A | 10/1981 | McMahon |
| 4,330,732 A | 5/1982 | Lowther |
| 4,377,455 A | 3/1983 | Kadija et al. |
| 4,391,914 A * | 7/1983 | Beall ................................. 501/4 |
| 4,448,160 A | 5/1984 | Vosper |
| 4,469,160 A | 9/1984 | Giamei |
| 4,483,485 A | 11/1984 | Kamiya et al. |
| 4,511,612 A | 4/1985 | Huther et al. |
| 4,528,270 A | 7/1985 | Matsunaga |
| 4,536,452 A | 8/1985 | Stempin et al. |
| 4,567,857 A | 2/1986 | Houseman et al. |
| 4,574,037 A | 3/1986 | Samejima et al. |
| 4,677,960 A | 7/1987 | Ward |
| 4,684,211 A | 8/1987 | Weber et al. |
| 4,688,538 A | 8/1987 | Ward et al. |
| 4,733,646 A | 3/1988 | Iwasaki |
| 4,742,265 A | 5/1988 | Giachino et al. |
| 4,760,818 A | 8/1988 | Brooks et al. |
| 4,760,820 A | 8/1988 | Tozzi |
| 4,774,914 A | 10/1988 | Ward |
| 4,774,919 A | 10/1988 | Matsuo et al. |
| 4,777,925 A | 10/1988 | Lasota |
| 4,841,925 A | 6/1989 | Ward |
| 4,922,883 A | 5/1990 | Iwasaki |
| 4,932,263 A | 6/1990 | Wlodarczyk |
| 4,977,873 A | 12/1990 | Cherry et al. |
| 4,982,708 A | 1/1991 | Stutzenberger |
| 5,034,852 A | 7/1991 | Rosenberg |
| 5,035,360 A | 7/1991 | Green et al. |
| 5,036,669 A | 8/1991 | Earleson et al. |
| 5,055,435 A | 10/1991 | Hamanaka et al. |
| 5,056,496 A | 10/1991 | Morino et al. |
| 5,072,617 A | 12/1991 | Weiss |
| 5,076,223 A | 12/1991 | Harden et al. |
| 5,095,742 A | 3/1992 | James et al. |
| 5,107,673 A | 4/1992 | Sato et al. |
| 5,109,817 A | 5/1992 | Cherry |
| 5,131,376 A | 7/1992 | Ward et al. |
| 5,150,682 A | 9/1992 | Magnet |
| 5,193,515 A | 3/1993 | Oota et al. |
| 5,207,208 A | 5/1993 | Ward |
| 5,211,142 A | 5/1993 | Matthews et al. |
| 5,220,901 A | 6/1993 | Morita et al. |
| 5,222,481 A | 6/1993 | Morikawa |
| 5,267,601 A | 12/1993 | Dwivedi |
| 5,297,518 A | 3/1994 | Cherry |
| 5,305,360 A | 4/1994 | Remark et al. |
| 5,328,094 A | 7/1994 | Goetzke et al. |
| 5,329,606 A | 7/1994 | Andreassen |
| 5,343,699 A | 9/1994 | McAlister |
| 5,377,633 A | 1/1995 | Wakeman |
| 5,390,546 A | 2/1995 | Wlodarczyk |
| 5,392,745 A | 2/1995 | Beck |
| 5,394,852 A | 3/1995 | McAlister |
| 5,421,195 A | 6/1995 | Wlodarczyk |
| 5,421,299 A | 6/1995 | Cherry |
| 5,435,286 A | 7/1995 | Carroll, III et al. |
| 5,439,532 A | 8/1995 | Fraas |
| 5,456,241 A | 10/1995 | Ward |
| 5,475,772 A | 12/1995 | Hung et al. |
| 5,517,961 A | 5/1996 | Ward |
| 5,531,199 A | 7/1996 | Bryant et al. |
| 5,549,746 A | 8/1996 | Scott et al. |
| 5,584,490 A | 12/1996 | Inoue et al. |
| 5,588,299 A | 12/1996 | DeFreitas |
| 5,605,125 A | 2/1997 | Yaoita |
| 5,607,106 A | 3/1997 | Bentz et al. |
| 5,608,832 A | 3/1997 | Pfandl et al. |
| 5,676,026 A | 10/1997 | Tsuboi et al. |
| 5,699,253 A | 12/1997 | Puskorius et al. |
| 5,702,761 A | 12/1997 | DiChiara, Jr. et al. |
| 5,704,553 A | 1/1998 | Wieczorek et al. |
| 5,714,680 A | 2/1998 | Taylor et al. |
| 5,715,788 A | 2/1998 | Tarr et al. |
| 5,738,818 A | 4/1998 | Atmur et al. |
| 5,745,615 A | 4/1998 | Atkins et al. |
| 5,746,171 A | 5/1998 | Yaoita |
| 5,767,026 A | 6/1998 | Kondoh et al. |
| 5,797,427 A | 8/1998 | Buescher |
| 5,806,581 A | 9/1998 | Haasch et al. |
| 5,816,217 A | 10/1998 | Wong |
| 5,853,175 A | 12/1998 | Udagawa |
| 5,863,326 A | 1/1999 | Nause et al. |
| 5,876,659 A | 3/1999 | Yasutomi et al. |
| 5,915,272 A | 6/1999 | Foley et al. |
| 5,930,420 A | 7/1999 | Atkins et al. |
| 5,941,207 A | 8/1999 | Anderson et al. |
| 5,947,091 A | 9/1999 | Krohn et al. |
| 6,015,065 A | 1/2000 | McAlister |
| 6,017,390 A | 1/2000 | Charych et al. |
| 6,026,568 A | 2/2000 | Atmur et al. |
| 6,029,627 A | 2/2000 | Vandyne |
| 6,042,028 A | 3/2000 | Xu |
| 6,062,498 A | 5/2000 | Klopfer |
| 6,085,990 A | 7/2000 | Augustin |
| 6,092,501 A | 7/2000 | Matayoshi et al. |
| 6,092,507 A | 7/2000 | Bauer et al. |
| 6,093,338 A | 7/2000 | Tani et al. |
| 6,102,303 A | 8/2000 | Bright et al. |
| 6,131,607 A | 10/2000 | Cooke |
| 6,138,639 A | 10/2000 | Hiraya et al. |
| 6,155,212 A | 12/2000 | McAlister |
| 6,173,913 B1 | 1/2001 | Shafer et al. |
| 6,185,355 B1 | 2/2001 | Hung |
| 6,189,522 B1 | 2/2001 | Moriya |
| 6,253,728 B1 | 7/2001 | Matayoshi et al. |
| 6,267,307 B1 | 7/2001 | Pontoppidan |
| 6,281,976 B1 | 8/2001 | Taylor et al. |
| 6,335,065 B1 | 1/2002 | Steinlage et al. |
| 6,340,015 B1 | 1/2002 | Benedikt et al. |
| 6,360,721 B1 | 3/2002 | Schuricht et al. |
| 6,378,485 B2 | 4/2002 | Elliott |
| 6,386,178 B1 | 5/2002 | Rauch |
| 6,446,597 B1 | 9/2002 | McAlister |
| 6,455,173 B1 | 9/2002 | Marijnissen et al. |
| 6,455,451 B1 * | 9/2002 | Brodkin et al. .................... 501/5 |
| 6,478,007 B2 | 11/2002 | Miyashita et al. |
| 6,483,311 B1 | 11/2002 | Ketterer |
| 6,490,391 B1 | 12/2002 | Zhao et al. |
| 6,501,875 B2 | 12/2002 | Zhao et al. |
| 6,503,584 B1 | 1/2003 | McAlister |
| 6,506,336 B1 | 1/2003 | Beall et al. |
| 6,516,114 B2 | 2/2003 | Zhao et al. |
| 6,517,011 B1 | 2/2003 | Ayanji et al. |
| 6,517,623 B1 * | 2/2003 | Brodkin et al. .................. 106/35 |
| 6,532,315 B1 | 3/2003 | Hung et al. |
| 6,542,663 B1 | 4/2003 | Zhao et al. |
| 6,543,700 B2 | 4/2003 | Jameson et al. |
| 6,549,713 B1 | 4/2003 | Pi et al. |
| 6,550,458 B2 | 4/2003 | Yamakado et al. |
| 6,556,746 B1 | 4/2003 | Zhao et al. |
| 6,561,168 B2 | 5/2003 | Hokao et al. |
| 6,567,599 B2 | 5/2003 | Hung |
| 6,571,035 B1 | 5/2003 | Pi et al. |
| 6,578,775 B2 | 6/2003 | Hokao |
| 6,583,901 B1 | 6/2003 | Hung |
| 6,584,244 B2 | 6/2003 | Hung |

| | | |
|---|---|---|
| 6,585,171 B1 | 7/2003 | Boecking |
| 6,587,239 B1 | 7/2003 | Hung |
| 6,615,810 B2 | 9/2003 | Funk et al. |
| 6,615,899 B1 | 9/2003 | Woodward et al. |
| 6,621,964 B2 | 9/2003 | Quinn et al. |
| 6,663,027 B2 | 12/2003 | Jameson et al. |
| 6,672,277 B2 | 1/2004 | Yasuoka et al. |
| 6,700,306 B2 | 3/2004 | Nakamura et al. |
| 6,705,274 B2 | 3/2004 | Kubo |
| 6,719,224 B2 | 4/2004 | Takeuchi et al. |
| 6,722,339 B2 | 4/2004 | Elliott |
| 6,722,340 B1 | 4/2004 | Sukegawa et al. |
| 6,722,840 B2 | 4/2004 | Fujisawa et al. |
| 6,725,826 B2 | 4/2004 | Esteghlal |
| 6,756,140 B1 | 6/2004 | McAlister |
| 6,763,811 B1 | 7/2004 | Tamol, Sr. |
| 6,776,352 B2 | 8/2004 | Jameson |
| 6,779,513 B2 | 8/2004 | Pellizzari et al. |
| 6,796,516 B2 | 9/2004 | Maier et al. |
| 6,799,513 B2 | 10/2004 | Schafer |
| 6,802,894 B2 * | 10/2004 | Brodkin et al. ............... 106/35 |
| 6,811,103 B2 | 11/2004 | Gurich et al. |
| 6,814,313 B2 | 11/2004 | Petrone et al. |
| 6,845,920 B2 | 1/2005 | Sato et al. |
| 6,851,413 B1 | 2/2005 | Tamol, Sr. |
| 6,854,438 B2 | 2/2005 | Hilger et al. |
| 6,898,355 B2 | 5/2005 | Johnson et al. |
| 6,899,076 B2 | 5/2005 | Funaki et al. |
| 6,904,893 B2 | 6/2005 | Hotta et al. |
| 6,912,998 B1 | 7/2005 | Rauznitz et al. |
| 6,940,213 B1 | 9/2005 | Heinz et al. |
| 6,955,154 B1 | 10/2005 | Douglas |
| 6,976,683 B2 | 12/2005 | Eckert et al. |
| 6,984,305 B2 | 1/2006 | McAlister |
| 6,994,073 B2 | 2/2006 | Tozzi et al. |
| 7,007,658 B1 | 3/2006 | Cherry et al. |
| 7,007,661 B2 | 3/2006 | Warlick |
| 7,013,863 B2 | 3/2006 | Shiraishi et al. |
| 7,025,358 B2 | 4/2006 | Ueta et al. |
| 7,032,845 B2 | 4/2006 | Dantes et al. |
| 7,070,126 B2 | 7/2006 | Shinogle |
| 7,073,480 B2 | 7/2006 | Shiraishi et al. |
| 7,077,108 B2 | 7/2006 | Fujita et al. |
| 7,077,379 B1 | 7/2006 | Taylor |
| 7,086,376 B2 | 8/2006 | McKay |
| 7,104,246 B1 | 9/2006 | Gagliano et al. |
| 7,104,250 B1 | 9/2006 | Yi et al. |
| 7,121,253 B2 | 10/2006 | Shiraishi et al. |
| 7,131,426 B2 | 11/2006 | Ichinose et al. |
| 7,138,046 B2 | 11/2006 | Roychowdhury |
| 7,140,347 B2 | 11/2006 | Suzuki et al. |
| 7,140,353 B1 | 11/2006 | Rauznitz et al. |
| 7,140,562 B2 | 11/2006 | Holzgrefe et al. |
| 7,201,136 B2 | 4/2007 | McKay et al. |
| 7,228,840 B2 | 6/2007 | Sukegawa et al. |
| 7,249,578 B2 | 7/2007 | Fricke et al. |
| 7,255,290 B2 | 8/2007 | Bright et al. |
| 7,278,392 B2 | 10/2007 | Zillmer et al. |
| 7,305,971 B2 | 12/2007 | Fujii |
| 7,340,118 B2 | 3/2008 | Wlodarczyk et al. |
| 7,386,982 B2 | 6/2008 | Runkle et al. |
| 7,404,395 B2 | 7/2008 | Yoshimoto |
| 7,418,940 B1 | 9/2008 | Yi et al. |
| 7,484,369 B2 | 2/2009 | Myhre |
| 7,527,041 B2 | 5/2009 | Wing et al. |
| 7,540,271 B2 | 6/2009 | Stewart et al. |
| 7,554,250 B2 | 6/2009 | Kadotani et al. |
| 7,588,012 B2 | 9/2009 | Gibson et al. |
| 7,628,137 B1 | 12/2009 | McAlister |
| 7,703,775 B2 | 4/2010 | Matsushita et al. |
| 7,707,832 B2 | 5/2010 | Commaret et al. |
| 7,880,193 B2 | 2/2011 | Lam |
| 7,898,258 B2 | 3/2011 | Neuberth et al. |
| 7,918,212 B2 | 4/2011 | Verdejo et al. |
| 7,938,102 B2 | 5/2011 | Sherry |
| 7,942,136 B2 | 5/2011 | Lepsch et al. |
| 2002/0017573 A1 | 2/2002 | Sturman |
| 2002/0070287 A1 | 6/2002 | Jameson et al. |
| 2002/0084793 A1 | 7/2002 | Hung et al. |
| 2002/0131171 A1 | 9/2002 | Hung |
| 2002/0131666 A1 | 9/2002 | Hung et al. |
| 2002/0131673 A1 | 9/2002 | Hung |
| 2002/0131674 A1 | 9/2002 | Hung |
| 2002/0131686 A1 | 9/2002 | Hung |
| 2002/0131706 A1 | 9/2002 | Hung |
| 2002/0131756 A1 | 9/2002 | Hung |
| 2002/0141692 A1 | 10/2002 | Hung |
| 2002/0150375 A1 | 10/2002 | Hung et al. |
| 2002/0151113 A1 | 10/2002 | Hung et al. |
| 2002/0166536 A1 | 11/2002 | Hitomi et al. |
| 2003/0012985 A1 | 1/2003 | McAlister |
| 2004/0008989 A1 | 1/2004 | Hung |
| 2004/0256495 A1 | 12/2004 | Baker |
| 2005/0045146 A1 | 3/2005 | McKay et al. |
| 2005/0098663 A1 | 5/2005 | Ishii |
| 2005/0257776 A1 | 11/2005 | Bonutti |
| 2006/0016916 A1 | 1/2006 | Petrone et al. |
| 2006/0102140 A1 | 5/2006 | Sukegawa et al. |
| 2006/0108452 A1 | 5/2006 | Anzinger et al. |
| 2006/0169244 A1 | 8/2006 | Allen |
| 2007/0142204 A1 | 6/2007 | Park et al. |
| 2007/0189114 A1 | 8/2007 | Reiner et al. |
| 2007/0283927 A1 | 12/2007 | Fukumoto et al. |
| 2008/0072871 A1 | 3/2008 | Vogel et al. |
| 2008/0081120 A1 | 4/2008 | Van Ooij et al. |
| 2008/0098984 A1 | 5/2008 | Sakamaki |
| 2008/0103672 A1 | 5/2008 | Ueda et al. |
| 2009/0078798 A1 | 3/2009 | Gruendl et al. |
| 2009/0093951 A1 | 4/2009 | McKay et al. |
| 2009/0204306 A1 | 8/2009 | Goeke et al. |
| 2009/0264574 A1 | 10/2009 | Van Ooij et al. |
| 2010/0020518 A1 | 1/2010 | Bustamante |
| 2010/0043758 A1 | 2/2010 | Caley |
| 2010/0108023 A1 | 5/2010 | McAlister |
| 2010/0183993 A1 | 7/2010 | McAlister |
| 2011/0036309 A1 | 2/2011 | McAlister |
| 2011/0042476 A1 | 2/2011 | McAlister |
| 2011/0048374 A1 | 3/2011 | McAlister |
| 2011/0048381 A1 | 3/2011 | McAlister |
| 2011/0056458 A1 | 3/2011 | McAlister |
| 2011/0057058 A1 | 3/2011 | McAlister |
| 2011/0132319 A1 | 6/2011 | McAlister |
| 2011/0134049 A1 | 6/2011 | Lin et al. |
| 2011/0146619 A1 | 6/2011 | McAlister |
| 2011/0210182 A1 | 9/2011 | McAlister |
| 2011/0233308 A1 | 9/2011 | McAlister |

FOREIGN PATENT DOCUMENTS

| | | |
|---|---|---|
| EP | 392594 | 10/1990 |
| EP | 671555 | 9/1995 |
| EP | 1972606 A1 | 9/2008 |
| GB | 1038490 A | 8/1966 |
| JP | 61-023862 | 2/1986 |
| JP | 02-259268 | 10/1990 |
| JP | 08-049623 | 2/1996 |
| JP | 2008-334077 | 12/1996 |
| JP | 2004-324613 A | 11/2004 |
| KR | 2007-0026296 A | 3/2007 |
| KR | 2008-0073635 A | 8/2008 |
| WO | WO-2008-017576 | 2/2008 |

OTHER PUBLICATIONS

"Ford DIS/EDIS "Waste Spark" Ignition System." Accessed: Jul. 15, 2010. Printed: Jun. 8, 2011. <http://rockledge.home.comcast.net/~rockledge/RangerPictureGallery/DIS_EDIS.htm>. pp. 1-4.

"P dV's Custom Data Acquisition Systems Capabilities." PdV Consulting. Accessed: Jun. 28, 2010. Printed: May 16, 2011. <http://www.pdvconsult.com/capabilities%20-%20daqsys.html>. pp. 1-10.

"Piston motion equations." Wikipedia, the Free Encyclopedia. Published: Jul. 4, 2010. Accessed: Aug. 7, 2010. Printed: Aug. 7, 2010. <http://en.wikipedia.org/wiki/Dopant>. pp. 1-6.

"Piston Velocity and Acceleration." EPI, Inc. Accessed: Jun. 28, 2010. Printed: May 16, 2011. <http://www.epi-eng.com/piston_engine_technology/piston_velocity_and_acceleration.htm>. pp. 1-3.

"SmartPlugs—Aviation." SmartPlugs.com. Published: Sep. 2000. Accessed: May 31, 2011. <http://www.smartplugs.com/news/aeronews0900.htm>. pp. 1-3.

Bell et al. "A Super Solar Flare." NASA Science. Published: May 6, 2008. Accessed: May 17, 2011. <http://science.nasa.gov/science-news/science-at-nasa/2008/06may_carringtonflare/>. pp. 1-5.

Birchenough, Arthur G. "A Sustained-arc Ignition System for Internal Combustion Engines." NASA Technical Memorandum (NASA TM-73833). Lewis Research Center. Nov. 1977. pp. 1-15.

Britt, Robert Roy. "Powerful Solar Storm Could Shut Down U.S. for Months—Science News | Science & Technology | Technology News—FOXNews.com." FoxNews.com, Published: Jan. 9, 2009. Accessed: May 17, 2011. <http://www.foxnews.com/story/0,2933,478024,00.html>. pp. 1-2.

Brooks, Michael. "Space Storm Alert: 90 Seconds from Catastrophe." NewScientist. Mar. 23, 2009. pp. 1-7.

Doggett, William. "Measuring Internal Combustion Engine In-Cylinder Pressure with LabVIEW." National Instruments. Accessed: Jun. 28, 2010. Printed: May 16, 2011. <http://sine.ni.com/cs/app/doc/p/id/cs-217>. pp. 1-2.

Hodgin, Rick. "NASA Studies Solar Flare Dangers to Earth-based Technology." TG Daily. Published: Jan. 6, 2009. Accessed: May 17, 2011. <http://www.tgdaily.com/trendwatch/40830-nasa-studies-solar-flare-dangers-to-earth-based-technology>. pp. 1-2.

InfraTec GmbH. "Evaluation Kit for FPI Detectors | Datasheet—Detector Accessory." 2009. pp. 1-2.

International Search Report and Written Opinion for Application No. PCT/US2009/067044; Applicant: McAlister Technologies, LLC.; Date of Mailing: Apr. 14, 2010 (11 pages).

International Search Report and Written Opinion for Application No. PCT/US2010/002076; Applicant: McAlister Technologies, LLC.; Date of Mailing: Apr. 29, 2011 (8 pages).

International Search Report and Written Opinion for Application No. PCT/US2010/002077; Applicant: McAlister Technologies, LLC.; Date of Mailing: Apr. 29, 2011 (8 pages).

International Search Report and Written Opinion for Application No. PCT/US2010/002078; Applicant: McAlister Technologies, LLC.; Date of Mailing: Dec. 17, 2010 (9 pages).

International Search Report and Written Opinion for Application No. PCT/US2010/042812; Applicant: McAlister Technologies, LLC.; Date of Mailing: May 13, 2011 (9 pages).

International Search Report and Written Opinion for Application No. PCT/US2010/042815; Applicant: McAlister Technologies, LLC.; Date of Mailing: Apr. 29, 2011 (10 pages).

International Search Report and Written Opinion for Application No. PCT/US2010/042817; Applicant: McAlister Technologies, LLC.; Date of Mailing: Apr. 29, 2011 (8 pages).

Lewis Research Center. "Fabry-Perot Fiber-Optic Temperature Sensor." NASA Tech Briefs. Published: Jan. 1, 2009. Accessed: May 16, 2011. <http://www.techbriefs.com/content/view/2114/32/>.

Non-Final Office Action for U.S. Appl. No. 12/006,774; Applicant: McAlister Technologies, LLC; Date of Mailing: Jan. 30, 2009, 18 pages.

Non-Final Office Action for U.S. Appl. No. 12/581,825; Applicant: McAlister Technologies, LLC; Date of Mailing: Mar. 25, 2011 (15 pages).

Non-Final Office Action for U.S. Appl. No. 12/804,510; Applicant: McAlister Technologies, LLC; Date of Mailing: Mar. 1, 2011 (10 pages).

Non-Final Office Action for U.S. Appl. No. 12/961,453; Applicant: McAlister Technologies, LLC; Date of Mailing: Jun. 9, 2011 (4 pages).

Notice of Allowance for U.S. Appl. No. 12/006,774; Applicant: McAlister Technologies, LLC; Date of Mailing: Jul. 27, 2009, 20 pages.

Pall Corporation, Pall Industrial Hydraulics. Increase Power Output and Reduce Fugitive Emissions by Upgrading Hydrogen Seal Oil System Filtration. 2000. pp. 1-4.

Riza et al. "All-Silicon Carbide Hybrid Wireless-Wired Optics Temperature Sensor Network Basic Design Engineering for Power Plant Gas Turbines." International Journal of Optomechatronics, vol. 4, Issue 1. Jan. 2010. pp. 83-91.

Riza et al. "Hybrid Wireless-Wired Optical Sensor for Extreme Temperature Measurement in Next Generation Energy Efficient Gas Turbines." Journal of Engineering for Gas Turbines and Power, vol. 132, Issue 5. May 2010. pp. 051601-1-51601-11.

Salib et al. "Role of Parallel Reformable Bonds in the Self-Healing of Cross-Linked Nanogel Particles." Langmuir, vol. 27, Issue 7. 2011. pp. 3991-4003.

Erjavec, Jack. "Automotive Technology: a Systems Approach, vol. 2." Thomson Delmar Learning. Clifton Park, NY. 2005. p. 845.

Hollembeak, Barry. "Automotive Fuels & Emissions." Thomson Delmar Learning. Clifton Park, NY. 2005. p. 298.

International Search Report and Written Opinion for Application No. PCT/US2010/002080; Applicant: McAlister Technologies, LLC.; Date of Mailing: Jul. 7, 2011 (8 pages).

International Search Report and Written Opinion for Application No. PCT/US2010/054361; Applicant: McAlister Technologies, LLC.; Date of Mailing: Jun. 30, 2011, 9 pages.

International Search Report and Written Opinion for Application No. PCT/US2010/054364; Applicant: McAlister Technologies, LLC.; Date of Mailing: Aug. 22, 2011, 8 pages.

International Search Report and Written Opinion for Application No. PCT/US2010/059146; Applicant: McAlister Technologies, LLC.; Date of Mailing: Aug. 31, 2011, 11 pages.

International Search Report and Written Opinion for Application No. PCT/US2010/059147; Applicant: McAlister Technologies, LLC.; Date of Mailing: Aug. 31, 2011, 11 pages.

Non-Final Office Action for U.S. Appl. No. 13/027,051; Applicant: McAlister Technologies, LLC; Date of Mailing: Sep. 1, 2011, 7 pages.

Non-Final Office Action for U.S. Appl. No. 13/141,062; Applicant: McAlister Technologies, LLC; Date of Mailing: Aug. 11, 2011, 12 pages.

Non-Final Office Action for U.S. Appl. No. 12/961,461; Applicant: McAlister et al.; Date of Mailing: Jan. 17, 2012, 39 pages.

Final Office Action for U.S. Appl. No. 13/027,051; Applicant: McAlister Technologies, LLC; Date of Mailing: Oct. 20, 2011, 10 pages.

* cited by examiner

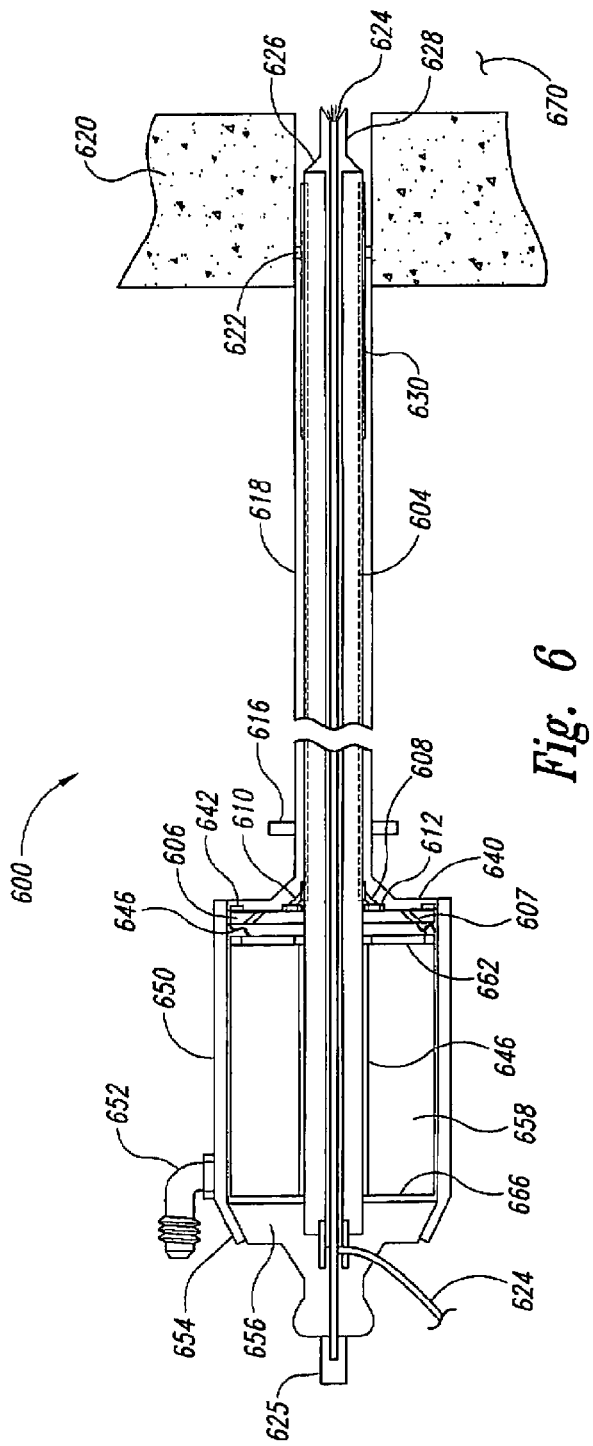
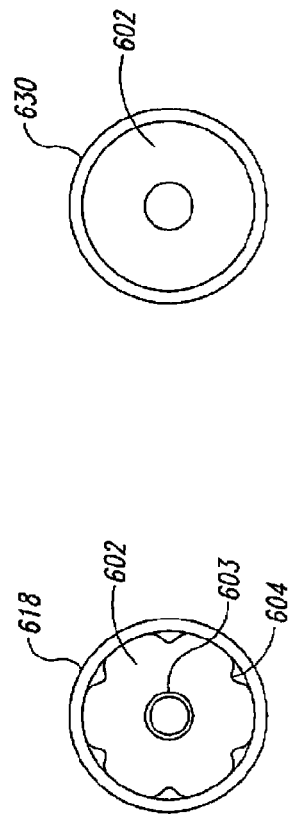
Fig. 6
Fig. 6A
Fig. 6B

CERAMIC INSULATOR AND METHODS OF USE AND MANUFACTURE THEREOF

CROSS-REFERENCE TO RELATED APPLICATION(S)

The present application claims priority to and the benefit of U.S. Provisional Application No. 61/237,425, filed Aug. 27, 2009 and titled OXYGENATED FUEL PRODUCTION; U.S. Provisional Application No. 61/237,466, filed Aug. 27, 2009 and titled MULTIFUEL MULTIBURST; U.S. Provisional Application No. 61/237,479, filed Aug. 27, 2009 and titled FULL SPECTRUM ENERGY; U.S. Provisional Application No. 61/304,403, filed Feb. 13, 2010 and titled FULL SPECTRUM ENERGY AND RESOURCE INDEPENDENCE; and U.S. Provisional Application No. 61/312,100, filed Mar. 9, 2010 and titled SYSTEM AND METHOD FOR PROVIDING HIGH VOLTAGE RF SHIELDING, FOR EXAMPLE, FOR USE WITH A FUEL INJECTOR. The present application is a continuation-in-part of PCT Application No. PCT/US09/67044, filed Dec. 7, 2009 and titled INTEGRATED FUEL INJECTORS AND IGNITERS AND ASSOCIATED METHODS OF USE AND MANUFACTURE. The present application is a continuation-in-part of U.S. patent application Ser. No. 12/653,085, filed Dec. 7, 2009 and titled INTEGRATED FUEL INJECTORS AND IGNITERS AND ASSOCIATED METHODS OF USE AND MANUFACTURE; which is a continuation-in-part of U.S. patent application Ser. No. 12/006,774 (now U.S. Pat. No. 7,628,137), filed Jan. 7, 2008 and titled MULTIFUEL STORAGE, METERING, AND IGNITION SYSTEM; and which claims priority to and the benefit of U.S. Provisional Application No. 61/237,466, filed Aug. 27, 2009 and titled MULTIFUEL MULTIBURST. The present application is a continuation-in-part of U.S. patent application Ser. No. 12/581,825, filed Oct. 19, 2009 and titled MULTIFUEL STORAGE, METERING, AND IGNITION SYSTEM; which is a divisional of U.S. patent application Ser. No. 12/006,774 (now U.S. Pat. No. 7,628,137), filed Jan. 7, 2008 and titled MULTIFUEL STORAGE, METERING, AND IGNITION SYSTEM. Each of these applications is incorporated herein by reference in its entirety.

TECHNICAL FIELD

The following disclosure relates generally to improved materials including improved dielectric insulators.

BACKGROUND

It has long been desired to interchangeably use methane, hydrogen or mixtures of methane and hydrogen as cryogenic liquids or compressed gases in place of gasoline in spark-ignited engines. But this goal has not been satisfactorily achieved, and as a result, the vast majority of motor vehicles remain dedicated to petrol even though the costs of methane and many forms of renewable hydrogen are far less than gasoline. Similarly it has long been a goal to interchangeably use methane, hydrogen or mixtures of methane and hydrogen as cryogenic liquids and/or compressed gases in place of diesel fuel in compression-ignited engines but this goal has proven even more elusive, and most diesel engines remain dedicated to pollutive and more expensive diesel fuel.

Conventional spark ignition systems include a high voltage but low energy ionization of a mixture of air and fuel. Conventional spark energy magnitudes of about 0.05 to 0.15 joule are typical for normally aspirated engines equipped with spark plugs that operate with compression ratios of 12:1 or less. Adequate voltage to produce such ionization must be increased with higher ambient pressure in the spark gap. Factors requiring higher voltage include leaner air-fuel ratios and a wider spark gap as may be necessary for ignition, increases in the effective compression ratio, supercharging, and reduction of the amount of impedance to air entry into a combustion chamber. Conventional spark ignition systems fail to provide adequate voltage generation to dependably provide spark ignition in engines such as diesel engines with compression ratios of 16:1 to 22:1 and often fail to provide adequate voltage for unthrottled engines that are supercharged for purposes of increased power production and improved fuel economy. These issues also plague alternative or mixed fuel engines.

Failure to provide adequate voltage at the spark gap is most often due to inadequate dielectric strength of ignition system components such as the spark plug porcelain and spark plug cables. High voltage applied to a conventional spark plug, which essentially is at the wall of the combustion chamber, causes heat loss of combusting homogeneous air-fuel mixtures that are at and near all surfaces of the combustion chamber including the piston, cylinder wall, cylinder head, and valves. Such heat loss reduces the efficiency of the engine and may degrade the combustion chamber components that are susceptible to oxidation, corrosion, thermal fatigue, increased friction due to thermal expansion, distortion, warpage, and wear due to loss of viability of overheated or oxidized lubricating films.

In addition, modern engines lack electrical insulation components having sufficient dielectric strength and durability for protecting components that must withstand cyclic applications of high voltage, corona discharges, and superimposed degradation due to shock, vibration, and rapid thermal cycling to high and low temperatures. Similarly, the combustion chamber of a modern diesel engine is designed with very small diameter ports for a "pencil" type direct fuel injector that must fit within the complex and tightly crowded inlet and exhaust valve operating mechanisms of a typical overhead valve engine head. A typical diesel fuel injector's port diameter for entry into the combustion chamber is limited to about 8.4 mm (0.331"). In addition to such severe space limitations, the hot lubricating oil is constantly splashed in the engine head environment within the valve cover to heat the fuel injector assembly to more than 115° C. (240° F.) for most of the million-mile life requirement, which prohibits application of conventional air-cooled solenoid valve designs.

It is highly desirable to overcome requirements that limit diesel engine operation to compression ignition and the use of diesel fuel of a narrow cetane rating and viscosity along with strict requirements for elimination of particles and water. The potential exists for more plentiful fuel selections with far less replacement cost wherein the fuels have a wide variation in cetane and/or octane ratings along with impurities such as water, nitrogen, carbon dioxide, carbon monoxide, and various particulates.

In order to provide smooth transition from economic dependence upon fossil fuels is highly desirable to enable interchangeable utilization of conventional diesel fuel or gasoline along with renewable fuels such as hydrogen, methane, or fuel alcohols. Improved insulators are required in instances that diesel fuel is to be utilized by application of sufficient plasma energy to the diesel fuel as it enters the combustion chamber to cause very rapid evaporation and cracking or subdivision of diesel fuel molecules, and production of ignition ions to thus overcome the formidable problems and limitations of compression ignition.

Accordingly, there is a need in the art for improved insulators and materials and method of manufacture and use, for example, materials with improved durability and dielectric strength for use in ignition system components for multifuel engines.

BRIEF DESCRIPTION OF THE DRAWINGS

FIG. 6 is a schematic cross-sectional side view of an injector/igniter configured in accordance with an embodiment of the disclosure.

FIGS. 6A and 6B are cross-sectional side views of the body 602 of FIG. 6 illustrating an insulator or dielectric body configured in accordance with another embodiment of the disclosure.

DETAILED DESCRIPTION

The present application incorporates by reference in their entirety the subject matter of each of the following U.S. patent applications, filed concurrently herewith on Jul. 21, 2010 and titled: INTEGRATED FUEL INJECTORS AND IGNITERS AND ASSOCIATED METHODS OF USE AND MANUFACTURE application Ser. No. 12/841,170; FUEL INJECTOR ACTUATOR ASSEMBLIES AND ASSOCIATED METHODS OF USE AND MANUFACTURE application Ser. No. 13/316,412; INTEGRATED FUEL INJECTORS AND IGNITERS WITH CONDUCTIVE CABLE ASSEMBLIES application Ser. No. 12/841,146; SHAPING A FUEL CHARGE IN A COMBUSTION CHAMBER WITH MULTIPLE DRIVERS AND/OR IONIZATION CONTROL application Ser. No. 12/841,149; METHOD AND SYSTEM OF THERMOCHEMICAL REGENERATION TO PROVIDE OXYGENATED FUEL, FOR EXAMPLE, WITH FUEL-COOLED FUEL INJECTORS application Ser. No. 12/804,509; and METHODS AND SYSTEMS FOR REDUCING THE FORMATION OF OXIDES OF NITROGEN DURING COMBUSTION IN ENGINES application Ser. No. 12/804,508.

In order to fully understand the manner in which the above-recited details and other advantages and objects according to the invention are obtained, a more detailed description of the invention will be rendered by reference to specific embodiments thereof.

Certain details are set forth in the following description and Figures to provide a thorough understanding of various embodiments of the disclosure. However, other details describe well-known structures and systems. It will be appreciated that several of the details set forth below are provided to describe the following embodiments in a manner sufficient to enable a person skilled in the relevant art to make and use the disclosed embodiments. Several of the details and advantages described below, however, may not be necessary to practice certain embodiments of the disclosure. Many of the details, dimensions, angles, shapes, and other features shown in the Figures are merely illustrative of particular embodiments of the disclosure. Accordingly, other embodiments can have other details, dimensions, angles, and features without departing from the spirit or scope of the present disclosure. In addition, those of ordinary skill in the art will appreciate that further embodiments of the disclosure can be practiced without several of the details described below.

Reference throughout this specification to "one embodiment" or "an embodiment" means that a particular feature, structure, or characteristic described in connection with the embodiment is included in at least one embodiment of the present disclosure. Thus, the occurrences of the phrases "in one embodiment" or "in an embodiment" in various places throughout this specification are not necessarily all referring to the same embodiment. Furthermore, the particular features, structures, or characteristics may be combined in any suitable manner in one or more embodiments. The headings provided herein are for convenience only and do not interpret the scope or meaning of the claimed disclosure.

Figure 1:
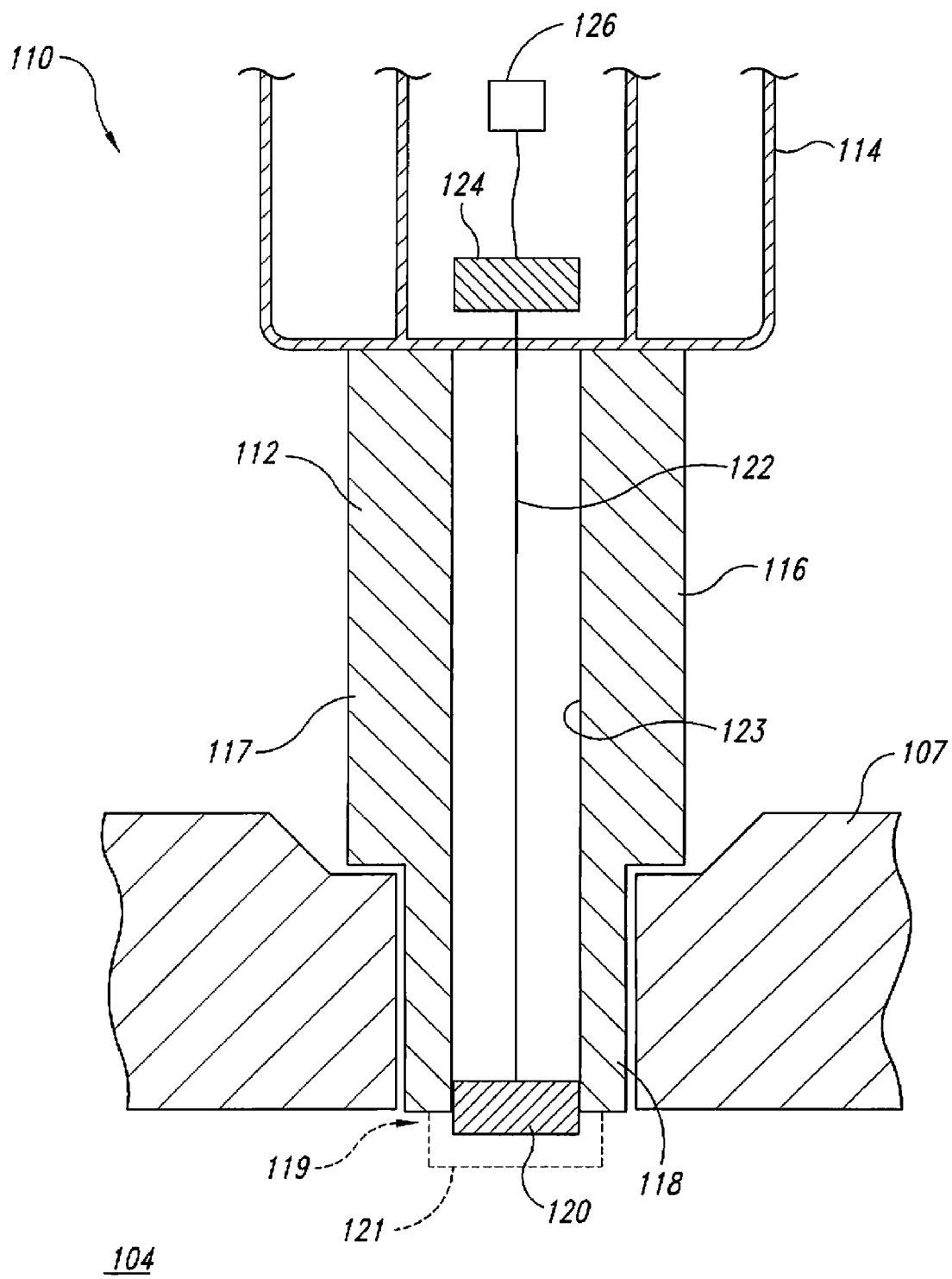
FIG. 1 is a schematic cross-sectional side view of an integrated injector/igniter configured in accordance with an embodiment of the disclosure.

FIG. 1 is a schematic cross-sectional side view of an integrated injector/igniter 110 ("injector 110") configured in accordance with an embodiment of the disclosure. The injector 110 illustrated in FIG. 1 is configured to inject different fuels into a combustion chamber 104 and to adaptively adjust the pattern and/or frequency of the fuel injections or bursts based on combustion properties and conditions in the combustion chamber 104. As explained in detail below, the injector 110 can optimize the injected fuel for rapid ignition and complete combustion. In addition to injecting the fuel, the injector 110 includes one or more integrated ignition features that are configured to ignite the injected fuel. As such, the injector 110 can be utilized to convert conventional internal combustion engines to be able to operate on multiple different fuels.

According to one aspect of the illustrated embodiment, at least a portion of the body 112 is made from one or more dielectric materials 117 suitable to enable the high-energy ignition to combust different fuels, including unrefined fuels or low energy density fuels. These dielectric materials 117 can provide sufficient electrical insulation of the high voltage for the production, isolation, and/or delivery of spark or plasma for ignition. In certain embodiments, the body 112 can be made from a single dielectric material 117. In other embodiments, however, the body 112 can include two or more dielectric materials. For example, at least a segment of the middle portion 116 can be made from a first dielectric material having a first dielectric strength, and at least a segment of the nozzle portion 118 can be made from a dielectric material having a second dielectric strength that is greater than the first dielectric strength. With a relatively strong second dielectric strength, the second dielectric material can protect the injector 110 from thermal and mechanical shock, fouling, voltage tracking, etc. Examples of suitable dielectric materials, as well as the locations of these materials on the body 112, are described in detail below.

Dielectric Features

Figure 2:
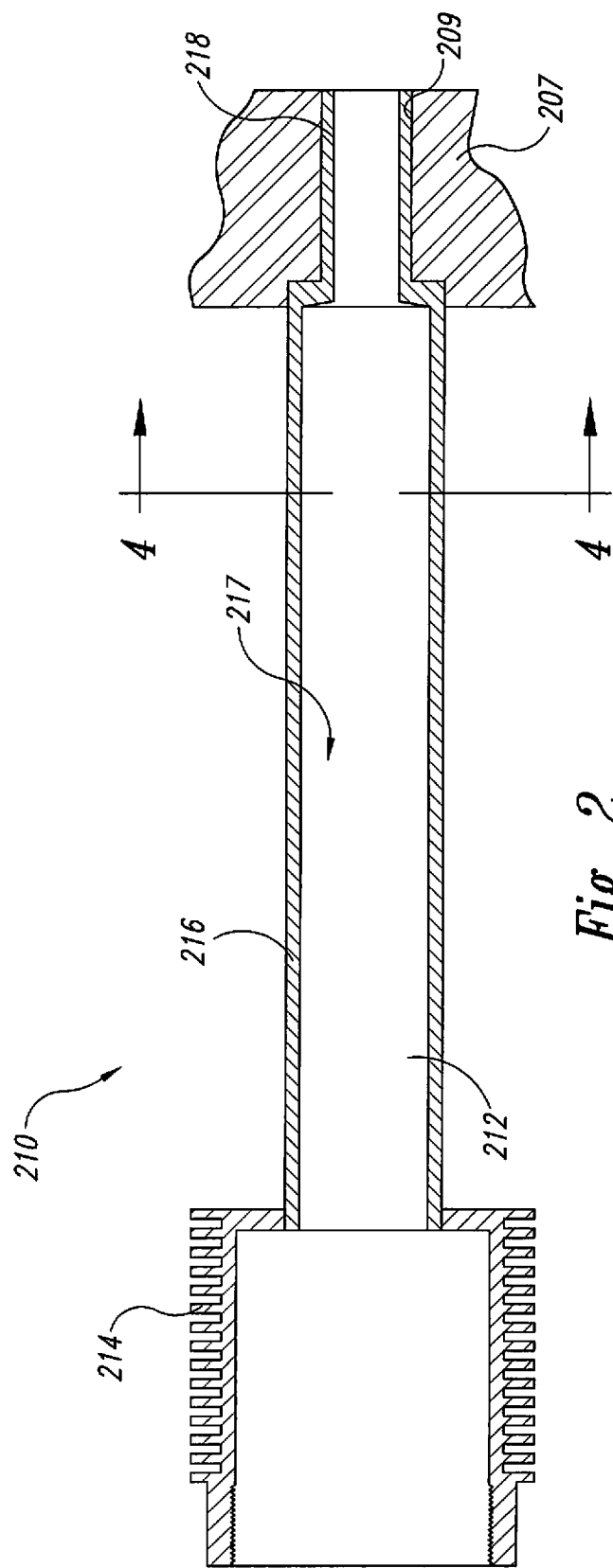
FIG. 2 is a cross-sectional side partial view of an injector configured in accordance with an embodiment of the disclosure.

In one aspect, FIG. 2 is a cross-sectional side partial view of an injector 210. The injector 210 shown in FIG. 2 illustrates several features of the dielectric materials that can be used according to several embodiments of the disclosure. The illustrated injector 210 includes several features that can be at least generally similar in structure and function to the corresponding features of the injectors described above with reference to FIG. 1. For example, the injector 210 includes a body 212 having a nozzle portion 218 extending from a middle portion 216. The nozzle portion 218 extends into an opening or entry port 209 in the engine head 207. Many engines, such as diesel engines, have entry ports 209 with very small diameters (e.g., approximately 7.09 mm or 0.279 inch in diameter). Such small spaces present the difficulty of providing adequate insulation for spark or plasma ignition of fuel species contemplated by the present disclosure (e.g., fuels that are approximately 3,000 times less energy dense than diesel fuel). However, and as described in detail below, injectors of the present disclosure have bodies 212 with dielectric or insulative materials that can provide for adequate electrical insulation for ignition wires to produce the required high voltage (e.g., 60,000 volts) for production, isolation, and/or delivery of ignition events (e.g., spark or plasma) in very small spaces. These dielectric or insulative materials are also configured for stability and protection against oxidation or other degradation due to cyclic exposure to high temperature and high-pressure gases produced by combustion. Moreover, as explained in detail below, these dielectric materials can be configured to integrate optical or electrical communication pathways from the combustion chamber to a sensor, such as a transducer, instrumentation, filter, amplifier, controller, and/or computer. Furthermore, the insulative materials can be brazed or diffusion bonded at a seal location with a metal base portion 214 of the body 212.

Spiral Wound Dielectric Features

Figure 3A:
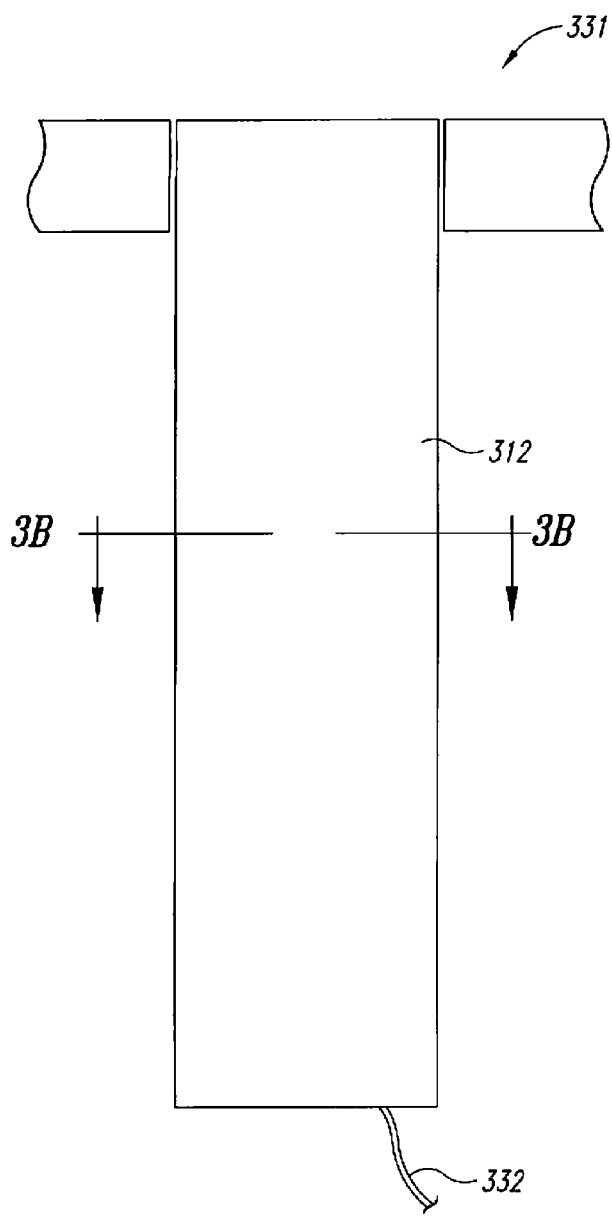
FIG. 3A is a side view of an insulator or dielectric body configured in accordance with one embodiment of the disclosure.
Figure 3B:
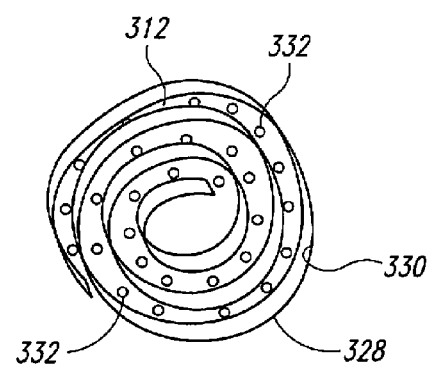
FIG. 3B is a cross-sectional side view taken substantially along the lines 3B-3B of FIG. 3A.

According to another aspect of the body 212 of the injector 210 illustrated in FIG. 2, the dielectric materials comprising the middle portion 216 and/or nozzle portion 218 of the injector 210 are illustrated in FIGS. 3A and 3B. More specifically, FIG. 3A is a side view of an insulator or dielectric body 312, and FIG. 3B is a cross-sectional side view taken substantially along the lines 3B-3B of FIG. 3A. Although the body 312 illustrated in FIG. 3A has a generally cylindrical shape, in other embodiments the body 312 can include other shapes, including, for example, nozzle portions extending from the body 312 toward a combustion chamber interface 331. Referring to FIGS. 3A and 3B together, in the illustrated embodiment the dielectric body 312 is composed of a spiral or wound base layer 328. In certain embodiments, the base layer 328 can be artificial or natural mica (e.g., pinhole free mica paper). In other embodiments, however, the base layer 328 can be composed of other materials suitable for providing adequate dielectric strength associated with relatively thin materials. In the illustrated embodiment, one or both of the sides of the base layer 328 are covered with a relatively thin dielectric coating layer 330. The coating layer 330 can be made from a high-temperature, high-purity polymer, such as Teflon NXT, Dyneon TFM, Parylene HT, Polyethersulfone, and/or Polyetheretherketone. In other embodiments, however, the coating layer 330 can be made from other materials suitable for adequately sealing the base layer 328.

The base layer 328 and coating layer 330 can be tightly wound into a spiral shape forming a tube thereby providing successive layers of sheets of the combined base layer 328 and coating layer 330. In certain embodiments, these layers can be bonded in the wound configuration with a suitable adhesive (e.g., ceramic cement). In other embodiments, these layers can be impregnated with a polymer, glass, fumed silica, or other suitable materials to enable the body 312 to be wrapped in the tightly wound tube shape. Moreover, the sheets or layers of the body 312 can be separated by successive applications of dissimilar films. For example, separate films between layers of the body 312 can include Parylene N, upon Parylene C upon Parylene HT film layers, and/or layers separated by applications of other material selections such as thin boron nitride, polyethersulfone, or a polyolefin such as polyethylene, or other suitable separating materials. Such film separation may also be accomplished by temperature or pressure instrumentation fibers including, for example, single-crystal sapphire fibers. Such fibers may be produced by laser heated pedestal growth techniques, and subsequently be coated with perfluorinated ethylene propylene (FEP) or other materials with similar index of refraction values to prevent leakage of energy from the fibers into potentially absorbing films that surround such fibers.

When the coating layer 330 is applied in relatively thin films (e.g., 0.1 to 0.3 mm), the coating layer 330 can provide approximately 2.0 to 4.0 KVolts/0.001" dielectric strength from −30° C. (e.g., −22° F.) up to about 230° C. (e.g., 450° F.). The inventor has found that coating layers 330 having a greater thickness may not provide sufficient insulation to provide the required voltage for ignition events. More specifically, as reflected in Table 1 below, coating layers with greater thickness have remarkably reduced dielectric strength. These reduced dielectric strengths may not adequately prevent arc-through and current leakage of the insulative body 312 at times that it is desired to produce the ignition event (e.g., spark or plasma) at the combustion chamber. For example, in many engines with high compression pressures, such as typical diesel or supercharged engines, the voltage required to initiate an ignition event (e.g., spark or plasma) is approximately 60,000 volts or more. A conventional dielectric body including a tubular insulator with only a 0.040 inch or greater effective wall thickness that is made of a conventional insulator may only provide 500 Volts/0.001" and will fail to adequately contain such required voltage.

TABLE 1

Dielectric Strength Comparisons of Selected Formulations

| Substance | Dielectric Strength (KV/mil) (<0.06 mm or 0.002" films) | Dielectric Strength (KV/mil) (>1.0 mm or 0.040") |
|---|---|---|
| Teflon NXT | 2.2-4.0 KV/.001" | 0.4-0.5 KV/.001" |
| Polyimide (Kapton) | 7.4 KV/.001" | — |
| Parylene (N, C, D, HT) | 4.2-7.0 KV/.001" | — |
| Dyneon TFM | 2.5-3.0 KV/.001" | 0.4-0.5 KV/.001" |
| CYTOP perfluoropolymer | 2.3-2.8 KV/0.001" | — |
| Sapphire (Single-Crystal) | 1.3-1.4 KV/0.001" | 1.2 KV/0.001" |
| Mica | 2.0-4.5 KV/0.001" | 1.4-1.9 KV/0.001" |
| Boron Nitride | 1.6 KV/0.001" | 1.4 KV/0.001" |
| PEEK | 3.0-3.8 KV/0.001" | 0.3-0.5 KV/0.001" |
| Polyethersulfone | 4.0-4.2 KV/0.001" | 0.3-0.5 KV/0.001" |
| Silica Quartz | 1.1-1.4 KV/0.001" | 1.1-1.4 KV/0.001" |

The embodiment of the insulator body 312 illustrated in FIGS. 3A and 3B can provide a dielectric strength of approximately 3,000 Volts/0.001" at temperatures ranging from −30° C. (e.g., −22° F.) up to approximately 450° C. (e.g., 840° F.). Moreover, the coating layers 330 can also serve as a sealant to the base layer 328 to prevent combustion gases and/or other pollutants from entering the body 312. The coating layers 330 can also provide a sufficiently different index of refraction to improve the efficiency of light transmission through the body 312 for optical communicators extending through the body 312.

According to another feature of the illustrated embodiment, the body 312 includes multiple communicators 332 extending longitudinally through the body 312 between sheets or layers of the base layers 328. In certain embodiments, the communicators 332 can be conductors, such as high voltage spark ignition wires or cables. These ignition wires can be made from metallic wires that are insulated or coated with oxidized aluminum thereby providing alumina on the wires. Because the communicators 332 extend longitudinally through the body 312 between corresponding base layers 328, the communicators 332 do not participate in any charge extending radially outwardly through the body 312. Accordingly, the communicators 332 do not affect or otherwise degrade the dielectric properties of the body 312. In addition to delivering voltage for ignition, in certain embodiments the communicators 332 can also be operatively coupled to one or more actuators and/or controllers to drive a flow valve for the fuel injection.

In other embodiments, the communicators 332 can be configured to transmit combustion data from the combustion chamber to one or more transducers, amplifiers, controllers, filter, instrumentation computer, etc. For example, the communicators 332 can be optical fibers or other communicators formed from optical layers or fibers such as quartz, aluminum fluoride, ZBLAN fluoride, glass, and/or polymers, and/or other materials suitable for transmitting data through an injector. In other embodiments, the communicators 332 can be made from suitable transmission materials such as Zirconium, Barium, Lanthanum, Aluminum, and Sodium Fluoride (ZBLAN), as well as ceramic or glass tubes.

Grain Orientation of Dielectric Features

Figure 4A:
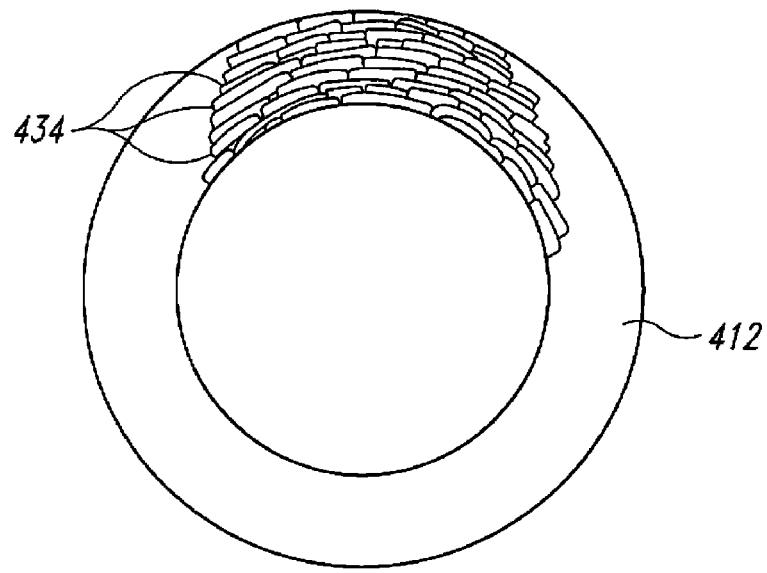
FIGS. 4A and 4B are cross-sectional side views taken substantially along the lines 4-4 of FIG. 2 illustrating an insulator or dielectric body configured in accordance with another embodiment of the disclosure.
Figure 4B:
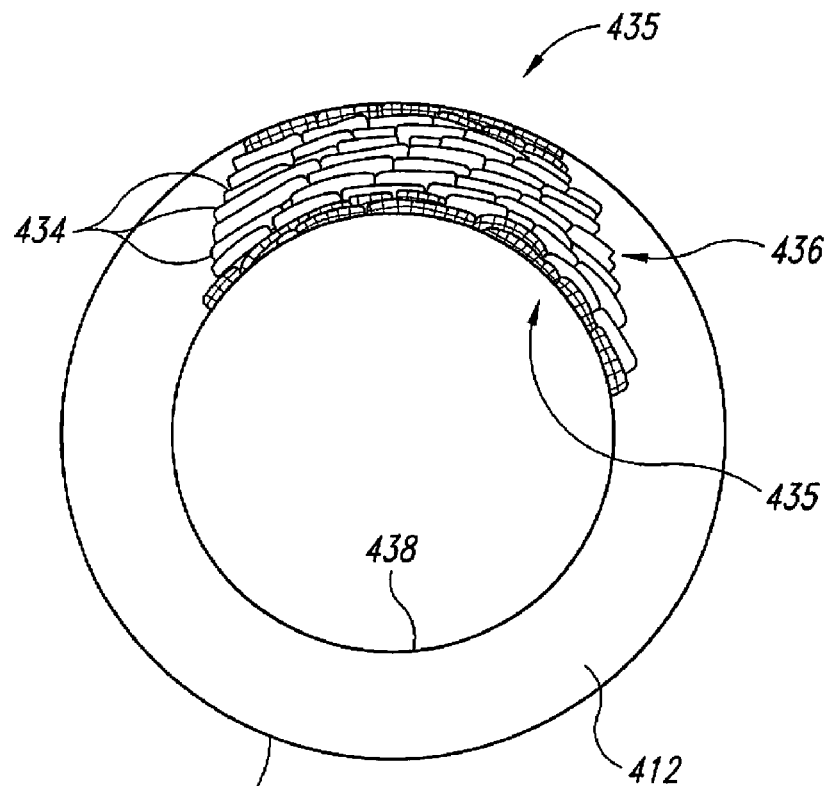

Referring again to FIG. 2, according to another embodiment of the injector 210 illustrated in FIG. 2 the dielectric materials of the body 212 (e.g., the middle portion 216 and/or the nozzle portion 218) may be configured to have specific grain orientations to achieve desired dielectric properties capable of withstanding the high voltages associated with the present disclosure. For example, the grain structure can include crystallized grains that are aligned circumferentially, as well as layered around the tubular body 212, thereby forming compressive forces at the exterior surface that are balanced by subsurface tension. More specifically, FIGS. 4A and 4B are cross-sectional side views of a dielectric body 412 configured in accordance with another embodiment of the disclosure and taken substantially along the lines 4-4 of FIG. 2. Referring first to FIG. 4A, the body 412 can be made of a ceramic material having a high dielectric strength, such as quartz, sapphire, glass matrix, and/or other suitable ceramics.

As shown in the illustrated embodiment, the body 412 includes crystalline grains 434 that are oriented in generally the same direction. For example, the grains 434 are oriented with each individual grain 434 having its longitudinal axis aligned in the direction extending generally circumferentially around the body 412. With the grains 434 layered in this orientation, the body 412 provides superior dielectric strength in virtually any thickness of the body 412. This is because the layered long, flat grains do not provide a good conductive path radially outwardly from the body 412.

FIG. 4B illustrates compressive forces in specific zones of the body 412. More specifically, according to the embodiment illustrated in FIG. 4B, the body 412 has been treated to at least partially arrange the grains 434 in one or more compressive zones 435 (i.e., zones including compressive forces according to the orientation of the grains 434) adjacent to an outer exterior surface 437 and an inner exterior surface 438 of the body 412. The body 412 also includes a non-compressive zone 436 of grains 434 between the compressive zones 435. The non-compressive zone 436 provides balancing tensile forces in a middle portion of the body 412. In certain embodiments, each of the compressive zones 435 can include more grains 434 per volume to achieve the compressive forces. In other embodiments, each of the compressive zones 435 can include grains 434 that have been influenced to retain locally amorphous structures, or that have been modified by the production of an amorphous structure or crystalline lattice that has less packing efficiency than the grains 434 of the non-compressive zone 436. In still further embodiments, the outer surface 437 and the inner surface 438 can be caused to be in compression as a result of ion implantation, sputtered surface layers, and/or diffusion of one or more substances into the surface such that the surface has a lower packing efficiency that the non-compressive zone 436 of the body 412. In the embodiment illustrated in FIG. 4B, the compressive zones 435 at the outside surface 437 and the inner surface 438 of the body 412 provide a higher anisotropic dielectric strength.

One benefit of the embodiment illustrated in FIG. 4B is that as a result of this difference in packing efficiency in the compressive zones 435 and the non-compressive zone 436, the surface in compression is caused to be in compression and becomes remarkably more durable and resistant to fracture or degradation. For example, such compressive force development at least partially prevents entry of substances (e.g., electrolytes such as water with dissolved substances, carbon rich materials, etc.) that could form conductive pathways in the body 412 thereby reducing the dielectric strength of the body 412. Such compressive force development also at least partially prevents degradation of the body 412 from thermal and/or mechanical shock from exposure to rapidly changing temperatures, pressures, chemical degradants, and impulse forces with each combustion event. For example, the embodiment illustrated in FIG. 4B is configured specifically for sustained voltage containment of the body 412, increased strength against fracture due to high loading forces including point loading, as well as low or high cycle fatigue forces.

Another benefit of the oriented crystalline grains 434 combined with the compressive zones 435, is that this configuration of the grains 434 provides maximum dielectric strength for containing voltage that is established across the body 412. For example, this configuration provides remarkable dielectric strength improvement of up to 2.4 KV/0.001 inch in sections that are greater than 1 mm or 0.040 inch thick. These are significantly higher values compared to the same ceramic composition without such new grain characterization with only approximately 1.0 to 1.3 KV/0.001 inch dielectric strength.

Several processes for producing insulators described above with compressive surface features are described in detail below. In one embodiment, for example, an insulator configured in accordance with an embodiment of the disclosure can be made from materials disclosed by U.S. Pat. No. 3,689,293, which is incorporated herein in its entirety by reference. For example, an insulator can be made from a material including the following ingredients by weight: 25-60% $SiO_2$, 15-35% $R_2O_3$ (where $R_2O_3$ is 3-15% $B_2O_3$ and 5-25% $Al_2O_3$), 4-25% MgO+0-7% $Li_2O$ (with the total of MgO+$Li_2O$ being between about 6-25%), 2-20% $R_2O$ (where $R_2O$ is 0-15% $Na_2O$, 0-15% $K_2O$, 0-15% $Rb_2O$), 0-15% $Rb_2O$, 0-20% $Cs_2O$, and with 4-20% F. More specifically, in one embodiment, an illustrative formula consists of 43.9% $SiO_2$, 13.8% MgO, 15.7% $Al_2O_3$, 10.7% $K_2O$, 8.1% $B_2O_3$, and 7.9% F. In other embodiments, however, insulators configured in accordance with embodiments of the disclosure can be made from greater or lesser percentages of these constituent materials, as well as different materials.

According to one embodiment of the disclosure, the ingredients constituting the insulator are ball milled and fused in a suitable closed crucible that has been made impervious and non-reactive to the formula of the constituent ingredients forming the insulator. The ingredients are held at approximately 1400° C. (e.g., 2550° F.) for a period that assures thorough mixing of the fused formula. The fused mass is then cooled and ball milled again, along with additives that may be selected from the group including binders, lubricants, and firing aids. The ingredients are then extruded in various desired shapes including, for example, a tube, and heated to about 800° C. (1470° F.) for a time above the transformation temperature. Heating above the transformation temperature stimulates fluoromica crystal nucleation. The extruded ingredients can then be further heated and pressure formed or extruded at about 850-1100° C. (1560-2010° F.). This secondary heating causes crystals that are being formed to become shaped as generally described above for maximizing the dielectric strength in preferred directions of the resulting product.

Crystallization of such materials, including, for example, mica glasses including a composition of $K_2Mg_5Si_8O_{20}F_4$, produces an exothermic heat release as the volumetric packing efficiency of the grains increases and the corresponding density increases. Transformation activity, such as nucleation, exothermic heat release rate, characterization of the crystallization, and temperature of the crystallization, is a function of fluorine content and or $B_2O_3$ content of the insulator. Accordingly, processing the insulator with control of these variables enables improvements in the yield, tensile, fatigue strength, and/or dielectric strength, as well as increasing the chemical resistance of the insulator.

This provides an important new anisotropic result of maximum dielectric strength as may be designed and achieved by directed forming including extruding a precursor tube into a smaller diameter or thinner walled tubing to produce elongated and or oriented crystal grains typical to the representational population that are formed and layered to more or less surround a desired feature such as an internal diameter that is produced by conforming to a mandrel that is used for accomplishing such hot forming or extrusion.

According to another embodiment, a method of at least partially orienting and/or compressing the grains 434 of FIGS. 4A/B according to the illustrated embodiment may be achieved by the addition of $B_2O_3$ and/or fluorine to surfaces that are desired to become compressively stressed against balancing tensile stresses in the substrate of formed and heat-treated products. Such addition of $B_2O_3$, fluorine, or similarly actuating agents may be accomplished in a manner similar to dopants that are added and diffused into desired locations in semiconductors. These actuating agents can also be applied as an enriched formula of the component formula that is applied by sputtering, vapor deposition, painting, and/or washing. Furthermore, these actuating agents by be produced by reactant presentation and condensation reactions.

Increased $B_2O_3$ and/or fluorine content of material at and near the surfaces that are desired to become compressively loaded causes more rapid nucleation of fluoromica crystals. This nucleation causes a greater number of smaller crystals to compete with diffusion added material in comparison with non-compressive substrate zones of the formula. This process accordingly provides for a greater packing efficiency in the non-compressive substrate zones than in the compressive zones closer to the surfaces that have received enrichment with $B_2O_3$, fluorine, and/or other actuating agents that produce the additional nucleation of fluoromica crystals. As a result, the desirable surface compression preloading strengthens the component against ignition events and chemical agents.

According to another method of producing or enhancing compressive forces that are balanced by tensile forces in corresponding substrates includes heating the target zone to be placed in compression. The target zone can be sufficiently heated to re-solution the crystals as an amorphous structure. The substrate can then be quenched to sufficiently retain substantial portions of the amorphous structure. Depending upon the type of components involved, such heating may be in a furnace. Such heating may also be by radiation from a resistance or induction heated source, as well as by an electron beam or laser. Another variation of this process is to provide for increased numbers of smaller crystals or grains by heat-treating and/or adding crystallization nucleation and growth stimulants (e.g., $B_2O_3$ and/or fluorine) to partially solutioned zones to rapidly provide recrystallization to develop the desired compressive stresses.

System for Manufacturing

Figure 5A:
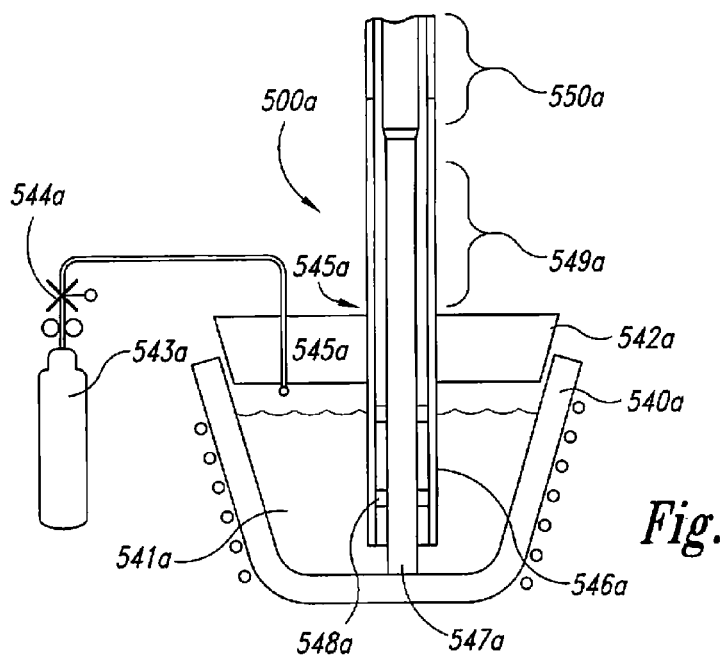
FIGS. 5A and 5B are schematic illustrations of systems for forming an insulator or dielectric body with compressive stresses in desired zones according to another embodiment of the disclosure.

FIG. 5A schematically illustrates a system 500a for implementing a process including fusion and extrusion for forming an insulator with compressive stresses in desired zones according to another embodiment of the disclosure. More specifically, in the illustrated embodiment the system 500a includes a crucible 540a that can be made from a refractory metal, ceramic, or pyrolytic graphite material. The crucible 540a can include a suitable conversion coating, or an impervious and non-reactive liner such as a thin selection of platinum or a platinum group barrier coating. The crucible 540a is loaded with a charge 541a of a recipe as generally described above (e.g., a charge containing approximately 25-60% $SiO_2$, 15-35% $R_2O_3$ (where $R_2O_3$ is 3-15% $B_2O_3$ and 5-25% $Al_2O_3$), 4-25% $MgO$+0-7% $Li_2O$ (where the total of $MgO$+$Li_2O$ being between about 6-25%), 2-20% $R_2O$ (where $R_2O$ is 0-15% $Na_2O$, 0-15% $K_2O$, 0-15% $Rb_2O$), 0-15% $Rb_2O$ and 0-20% $Cs_2O$, and 4-20% F), or suitable formulas for producing mica glass, such as a material with an approximate composition of $K_2Mg_5Si_8O_{20}F_4$.

The crucible can heat and fuse the charge 541a in a protective atmosphere. For example, the crucible 540a can heat the charge 541a via any suitable heating process including, for example, resistance, electron beam, laser, inductive heating, and/or by radiation from sources that are heated by such energy conversion techniques. After suitable mixing and fusion to produce a substantially homogeneous charge 541a, a cover or cap 542a applies pressure to the charge 541a in the crucible 540a. A gas source 543a can also apply an inert gas and/or process gas into the crucible 540a sealed by the cap 542a. A pressure regulator 544a can regulate the pressure in the crucible 540a to cause the fused charge 541a to flow into a die assembly 545a. The die assembly 545a is configured to form a tube-shaped dielectric body. The die assembly 545a includes a female sleeve 546a that receives a male mandrel 547a. The die assembly 545a also includes one or more rigidizing spider fins 548a. The formed tubing flows through the die assembly 545a into a first zone 549a where the formed tubing is cooled to solidify as amorphous material and begin nucleation of fluoromica crystals. The die assembly 545a then advances the tubing to a second zone 550a to undergo further refinement by reducing the wall thickness of the tubing to further facilitate crystallization of fluoromica crystals.

Figure 5B:
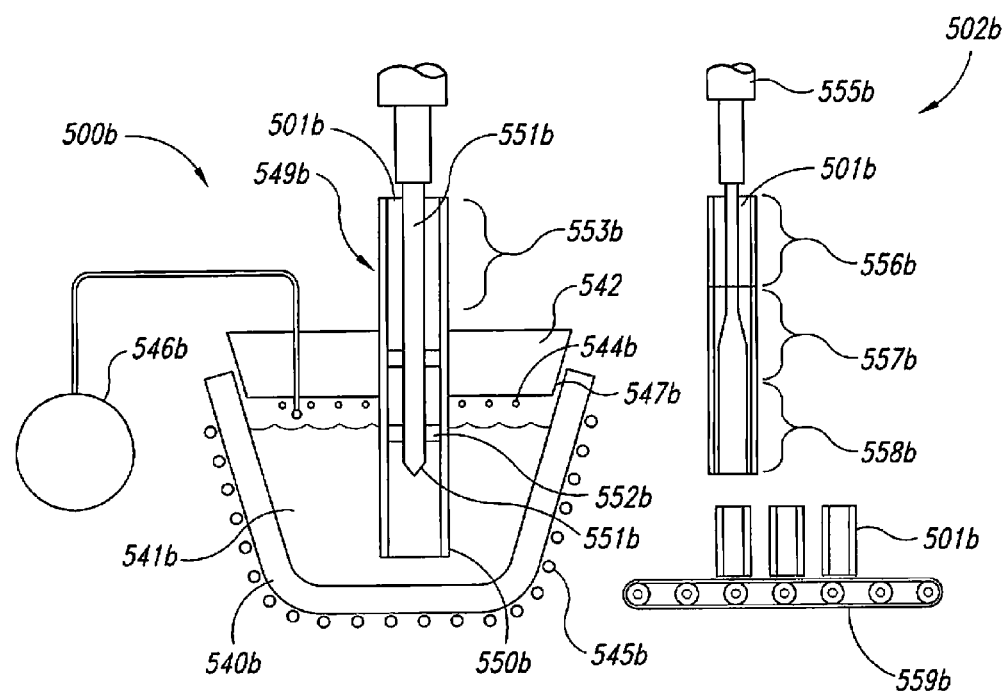

FIG. 5B schematically illustrates a system 500b for implementing a process also including fusion and extrusion for forming an insulator with compressive stresses in desired zones according to another embodiment of the disclosure. More specifically, in the illustrated embodiment the system 500b includes a crucible 540b that can be made from a refractory metal, ceramic, or pyrolytic graphite material. The crucible 540b can include a suitable conversion coating, or an impervious and non-reactive liner such as a thin selection of platinum or a platinum group barrier coating. The crucible 540b is loaded with a charge 541b of a recipe as generally described above (e.g., a charge containing approximately 25-60% $SiO_2$, 15-35% $R_2O_3$ (where $R_2O_3$ is 3-15% $B_2O_3$ and 5-25% $Al_2O_3$), 4-25% MgO+0-7% $Li_2O$ (where the total of MgO+$Li_2O$ being between about 6-25%), 2-20% $R_2O$ (where $R_2O$ is 0-15% $Na_2O$, 0-15% $K_2O$, 0-15% $Rb_2O$), 0-15% $Rb_2O$ and 0-20% $Cs_2O$, and 4-20% F), or suitable formulas for producing mica glass, such a material with an approximate composition of $K_2Mg_5Si_8O_{20}F_4$.

The system 500b also includes a cover or cap 542b including a reflective assembly 543b and heaters 544b. The system 500b can heat and fuse the charge 741b in a protective atmosphere, such as in a vacuum or with an inert gas between the crucible 540b and the cover 542b. For example, the system 500b can heat the charge 541b via crucible heaters 545b, the cover heaters 544b, and/or via any suitable heating process including, for example, resistance, electron beam, laser, inductive heating and/or by radiation from sources that are heated by such energy conversion techniques. After suitable mixing and fusion to produce a substantially homogeneous charge 541b, the cover 542b applies pressure to the charge 541b in the crucible 540b. A gas source 546b can also apply an inert gas and/or process gas into the crucible 540b sealed by the cover 542b at a seal interface 547b. A pressure regulator can regulate the pressure in the crucible 540b to cause the fused charge 541b to flow into a die assembly 549b. The die assembly 549b is configured to form a tube-shaped dielectric body. The die assembly 749b includes a female sleeve 550b that receives a male mandrel 551b. The die assembly 549b can also include one or more rigidizing spider fins 552b. The formed tubing 501b flows through the die assembly 549b into a first zone 553b where the formed tubing 501b is cooled to solidify as amorphous material and begin nucleation of fluoromica crystals.

At least a portion of the die assembly 549b, including the formed tubing 501b with nucleated fluoromica glass, is then rotated or otherwise moved to a position 502b aligned with a second die assembly. A cylinder 555b urges the formed tubing 501b from a first zone 556b to a second zone 557b. In the second zone 557b, the second die assembly can reheat the formed tubing 501b to accelerate crystal growth as it is further refined to continue production of preferably oriented grains described above. The formed tubing 501b is then advanced to a third zone 558b to undergo further grain refinement and orientation. Selected contact areas of the third zone 558b may be occasionally dusted or dressed with a grain nucleation accelerator, including, for example, $AlF_3$, $MgF_2$ and/or $B_2O_3$. In the third zone 558b, the formed tubing 501b is further refined by the reduction of the wall thickness of the formed tubing 501b to even further facilitate crystallization of fluoromica crystals and to thus generate the desired compressive forces in areas according to the grain structures described above, along with balancing tensile forces in areas described above. Subsequently, formed tubing 501b, which includes the exceptionally high physical and dielectric strength formed by the compressively stressed and impervious surfaces, can be deposited on a conveyer 559b for moving the formed tubing 501b.

Alternative systems and methods for producing insulative tubing with these improved dielectric properties may utilize a pressure gradient as disclosed in U.S. Pat. No. 5,863,326, which is incorporated herein by reference in its entirety, to develop the desired shape, powder compaction, and sintering processes. Further systems and methods can include the single crystal conversion process disclosed in U.S. Pat. No. 5,549,746, which is incorporated herein by reference in its entirety, as well as the forming process disclosed in U.S. Pat. No. 3,608,050, which is incorporated herein by reference in its entirety, to convert multicrystalline material into essentially single crystal material with much higher dielectric strength. According to embodiments of the disclosure, the conversion of multi-crystalline materials (e.g., alumina) with only approximately 0.3 to 0.4 KV/0.001" dielectric strength, to single crystal materials can achieve dielectric strengths of at least approximately 1.2 to 1.4 KV/0.001". This improved dielectric strength allows injectors according to the present disclosure to be used in various applications, including for example, with high-compression diesel engines with very small ports into the combustion chamber, as well as with high-boost supercharged and turbocharged engines.

According to yet another embodiment of the disclosure for forming insulators with high dielectric strength, insulators can be formed from any of the compositions illustrated in Table 2. More specifically, Table 2 provides illustrative formula selections of approximate weight-percentage compositions on an oxide basis, according to several embodiments of the disclosure.

TABLE 2

Illustrative Dielectric Compositions

| COMPOSITION D | COMPOSITION R |
|---|---|
| 44% $SiO_2$ | 41% $SiO_2$ |
| 16% $Al_2O_3$ | 21% MgO |
| 15% MgO | 16% $Al_2O_3$ |
| 9% $K_2O$ | 9% $B_2O_3$ |
| 8% $B_2O_3$ | 9% F |
| 8% F | 4% $K_2O$ |

Selected substance precursors that will provide the final oxide composition percentages, such as the materials illustrated in Table 2, can be ball milled and melted in a covered crucible at approximately 1300-1400° C. for approximately 4 hours to provide a homogeneous solution. The melt may then be cast to form tubes that are then annealed at approximately 500-600° C. Tubes may then be further heat treated at approximately 750° C. for approximately 4 hours and then dusted with a nucleation stimulant, such as $B_2O_3$. The tubes may then be reformed at approximately 1100 to 1250° C. to stimulate nucleation and produce the desired crystal orientation. These tubes may also be further heat treated for approximately 4 hours to provide dielectric strength of at least approximately 2.0 to 2.7 KV/0.001".

In still further embodiments, the homogeneous solution may be ball milled and provided with suitable binder and lubricant additives for ambient temperature extrusion to produce good tubing surfaces. The resulting tubing may then be coated with a film that contains a nucleation stimulant such as $B_2O_3$ and heat treated to provide at least approximately 1.9 to 2.5 KV/0.001" dielectric strength and improved physical strength. Depending upon the ability to retain suitable dimensions of the tubing, including for example, the "roundness" of the extruded tubing or the profile of the tubing, higher heat treatment temperatures may be provided for shorter times to provide similar high dielectric and physical strength properties.

The embodiments of the systems and methods for producing the dielectric materials described above facilitate improved dielectric strengths of various combinations of materials thereby solving the very difficult problems of high voltage containment required for combusting low energy density fuels. For example, injectors with high dielectric strength materials can be extremely rugged and capable of operation with fuels that vary from cryogenic mixtures of solids, liquids, and vapors to superheated diesel fuel, as well as other types of fuel.

In another aspect, the high strength dielectric material embodiments disclosed herein also enable new processes with various hydrocarbons that can be stored for long periods to provide heat and power by various combinations and applications of engine-generator-heat exchangers for emergency rescue and disaster relief purposes including refrigerated storage and ice production along with pure and or safe water and sterilized equipment to support medical efforts. Low vapor pressure and or sticky fuel substances may be heated to develop sufficient vapor pressure and reduced viscosity to flow quickly and produce fuel injection bursts with high surface to volume ratios that rapidly complete stratified or layered charge combustion processes. Illustratively, large blocks of paraffin, compressed cellulose, stabilized animal or vegetable fats, tar, various polymers including polyethylenes, distillation residuals, off-grade diesel oils and other long hydrocarbon alkanes, aromatics, and cycloalkanes may be stored in areas suitable for disaster response. These illustrative fuel selections that offer long-term storage advantages cannot be utilized by conventional fuel carburetion or injection systems. However the present embodiments provide for such fuels to be heated including provisions for utilization of hot coolant or exhaust streams from a heat engine in heat exchangers to produce adequate temperatures, for example between approximately 150-425° C. (300-800° F.) to provide for direct injection by injectors disclosed herein for very fast completion of combustion upon injection and plasma projection ignition.

Referring to FIG. 6, in another embodiment a fuel injector device is disclosed. This embodiment provides: (1) up to 3000 times greater fuel flow capacity than current diesel fuel injectors to enable utilization of low cost fuels such as landfill gas, anaerobic digester methane, and various mixtures of hydrogen and other fuel species along with substantial amounts of non-fuel substances such as water vapor, carbon dioxide, and nitrogen; (2) plasma ignition of such fuel as it is projected into the combustion chamber; and (3) replacement of diesel fuel injectors in the time of a tune-up.

Fuel injector 600 utilizes a ceramic insulator body 602 that provides dielectric containment of more than 80,000 volts at direct current to megahertz frequencies in sections that are less than 1.8 mm (0.071") thick between electrically conductive electrode 603 and the outer surface of insulator 602 as shown in FIGS. 600 and 602.

In instances that high frequency voltage is applied to establish ion currents or ion oscillation between electrodes 626 and the bore 620 of conductive layer 603 of copper or silver may be increased by additional plating to provide greater high frequency conductivity. In the alternative a litz wire braid may be placed over the optical fibers in the core to reduce resistive losses.

Insulator 602 is made from a glass with the approximate composition by weight percentage of Formula 1

Formula 1:

| | |
|---|---|
| $SiO_2$ | 24-48 |
| MgO | 12-28 |
| $Al_2O_3$ | 9-20 |
| $Cr_2O_3$ | 0.5-6.5 |
| F | 1-9 |

-continued

| | |
|---|---|
| BaO | 0-14 |
| CuO | 0-5 |
| SrO | 0-11 |
| $Ag_2O$ | 0-3.5 |
| NiO | 0-1.5 |
| $B_2O_3$ | 0-9 |

To produce the insulator 602, the composition is ball milled, melted in a suitable crucible such as a platinum, silica, magnesia, or alumina material selection and extruded, compression molded, or cast into masses suitable for reheating and forming into parts of near net shape and dimensions.

In one aspect of this embodiment, a suitable composition by weight such as set forth in Formula 2 is melted at a temperature between about 1350° C. and 1550° C. in a covered platinum, alumina, magnesia, or silica crucible.

Formula 2:

| | |
|---|---|
| $SiO_2$ | 31 |
| MgO | 22 |
| $Al_2O_3$ | 17 |
| $Cr_2O_3$ | 2.2 |
| F | 4.5 |
| BaO | 13 |
| CuO | 0.4 |
| SrO | 9.5 |
| $Ag_2O$ | 0.3 |
| NiO | 0.1 |

Tubular profiles can be extruded from the melt or somewhat cooled material that is hot formed at temperatures between about 1050° C. and 1200° C. Masses that are cast to provide the volume necessary for hot extrusion into tubing or other profiles or for forging into parts of near net shape and dimensions are slow cooled. Such masses are heated to a suitable temperature for hot forming such as between about 1050° C. and 1250° C. and formed by extrusion to the desired profile shapes and dimensions as may be produced through a suitable die including a refractory material such as platinum, molybdenum or graphite. The extruded profile is dusted with one or more suitable crystallization nucleates such as BN, $B_2O_3$, $AlF_3$, B, $AlB_2$, $AlB_{12}$ or AlN to produce a greater number of small crystals in the resulting surface zones than in the central zones to thus reduce the volumetric packing efficiency to provide compressive stresses in the surface zones and tensile stresses in the central zones.

Further development of compressive stresses may be produced if desired by elongation of the crystals in the outer layers by deformation and drag induced by the die as the extruded article is forced to form a smaller cross section, which causes such elongation.

More complex shapes and forms may be compression molded or formed in a super alloy or graphite mold assembly that has been dusted with suitable crystallization nucleates such as $B_2O_3$ or BN to produce similar compressive stresses in near surface zones.

Previous applications desired combinations of chemical formulas and heat treatments for production of machinable material. This embodiment accomplishes the opposite, such that it produces articles that cannot be machined because the surface zones are too hard to be machined due to the compressive stresses that are balanced by tensile stresses in central section zones between or adjacent to zones with compressive stresses.

This embodiment overcomes the inherent prior art drawbacks including producing material that is designed to intentionally crack near zones where cutting tools apply stress to enable progressive chip formation to provide machinability. Such characteristic crack formation to allow machinability, however, inherently allows adverse admissions of substances such as organic compounds including engine lubricants, surfactants, hand fat and sweat into such cracks. Organic materials eventually tend to dehydrogenate or in other ways become carbon donors which then subsequently become electrically conductive pathways along with various electrolytes that are introduced into such cracks to compromise the dielectric strength of the machinable ceramic article, which ultimately causes voltage containment failure. The present embodiment remedies these drawbacks.

In another aspect of this embodiment, another suitable formula for components such as insulator 602 of FIG. 6 (shown as a tube) has the approximate weight percentages as set forth in Formula 3:

Formula 3

| | |
|---|---|
| $SiO_2$ | 30 |
| MgO | 22 |
| $Al_2O_3$ | 18 |
| $Cr_2O_3$ | 3.2 |
| F | 4.3 |
| BaO | 12 |
| SrO | 3.6 |
| CuO | 4.9 |
| $Ag_2O$ | 1.3 |
| NiO | 0.1 |

Insulator 602 is formed with the cross section shown in FIG. 602 including bore 603 and grooves or channels 604. At the zone nearest to the combustion chamber channels 604 are closed by tapering into the diameter that elastomer tubing normally closes and seals against as shown in FIG. 604. After insulator tube 602 is extruded it is cooled to about 650° C. by passage of hydrogen through bore 603 which reduces the copper oxide and/or silver oxide to produce a metallic surface of copper and/or an alloy of silver and copper. After development of a suitable thickness of conductive metal 603, the outer surface of tube 602 is heated by a suitable source such as radiation from an induction heated tube surrounding 602 or by an oxidizing flame such as a surplus oxygen-hydrogen flame and a suitable crystallization and/or fineness agent is administered to the surface to produce compressive stresses that are balanced by tensile forces in the zone within the interior of insulator tube 602.

Insulator 602 may be formed as a tube by extrusion or hot forging and includes grooves or channels 604 for fuel passage from a suitable metering valve such as disk 606, which is normally closed against orifices 608. Orifices 608 connect through passages 610 to an annular groove that delivers fuel to channels 604 as shown. Orifices 608 may have suitable seal components such as O-rings 612 as shown to assure leak free shut off of fuel flow at times that disk 606 is in the normally closed position against such orifices.

Suitable sleeve 618 may be a high strength polymer such as polyamide-imide (Torlon) or a thermosetting composite with Kapton, glass fiber or graphite reinforcement or in the alternative it may be an aluminum, titanium or steel alloy. Sleeve 618 includes suitable mounting feature 616 that enables rapid clamping for replacement of the previously utilized diesel fuel injector in the host engine. Seal 622 may be an elastomer such as a FKM, Viton or a fluorosilicone elastomer to seal 618 against the gases produced in the combustion chamber and to prevent passage of engine lubricant into the combustion chamber.

In operation, fuel is admitted through suitable fitting 652 to cool solenoid winding 658. Just before desired fuel-injection, current is established in solenoid winding 658 to attract valve disk 606 away from permanent ring-disk magnet 642. In the alternative or in addition a suitable disk spring 646 is compressed as valve 606 opens to allow fuel flow through zone 662 to pass through orifices 408 into channels 604 and to the zone past seal 622 to open elastomer sleeve 630 and allow fuel to burst into the zone between electrode 626 and the combustion chamber entry port bore through section 620 as shown in FIG. 6. Elastomer sleeve 630 is normally closed against the cylindrical portion of insulator 602 that extends beyond the end of grooves 604 as shown.

In applications that a solenoid assembly is chosen instead of a piezoelectric, pneumatic, hydraulic or mechanical linkage for actuation of valve 606, extremely fast acting operation of ferromagnetic valve 606 is provided by application of 24 to 240 VDC to insulated winding 658. This servers the purpose of developing exceptionally high current and valve actuation force for short times in about 3% to 21% duty cycles depending upon the mode of operation to enable cooling of the solenoid components as a result of heat transfer to fuel that flows from fitting 652 to cool winding 658 as it passes through slots or passages 607 of valve 606 to orifices 608 as shown.

Fuel is delivered by channels 604 to elastomeric tube valve 630 which is normally sealed against insulator 602. Pressurization of the fuel in channels 604 by the opening of valve 606 forces tube valve 630 open and fuel is injected into the combustion chamber through the annular opening presented.

Suitable insulation of the copper magnet wire for such applications include polyimide varnish and aluminum plating on the copper wire selected, in which the aluminum plating is oxidized or partially oxidized to produce alumina. Such aluminum plating and oxidation may also be utilized in combination with polyimide or polyamide-imide or parylene insulation films. The assembly shown with ferromagnetic components 666, 650, and 662 direct the magnetic flux produced by winding 664 through ferromagnetic valve 606 to enable very fast action of valve 606.

Insulator 656 may be produced from any of the formulas given herein and provides containment of high voltage applied by a suitable insulated cable that is inserted into receiver 660 to contact conductor 603 thus providing connection to a suitable source such as a piezoelectric or induction transformer. Insulator 656 may be sealed against ferromagnetic sleeve 650 by swaging, brazing, soldering or by a suitable sealant such as epoxy as shown and along with insulator 602 contains ferromagnetic disks 666 and 662 as shown.

In instances that production line brazing or soldering of insulator 656 to 650 is desired at contact zone 654, the corresponding contact zone of 656 may be metalized by masked or otherwise localized hydrogen reduction of copper oxide and/or silver oxide such as provided in Formula 3. Alternatively a suitable metallic zone may be plated by other suitable technologies including sputtering or vapor deposition.

Instrumentation such as optical fibers 624 may therefore be protected by insulator 602 through electrode portions 626 and 628 to the interface of combustion chamber 670 as shown in FIG. 6A.

FIG. 6B shows an alternative orientation of fuel inlet fitting 652 and arrangements for developing temperature, pressure data and delivery of such data to a microprocessor by fiber optics 624 that pass through the core of the high voltage conductor 603 as shown. High voltage supplied by a suitable source such as a transformer, capacitor, or piezoelectric generator is applied through an insulated cable and dielectric boot to terminal 625 and is conducted through conductive tube or surface 603 to electrode 626 for developing a plasma in the annular zone between electrode 626 continuing to a feature 628 that is suitable for projecting fuel into the combustion chamber in the desired pattern and which surrounds and protects fiber optics 624 as shown.

Alternate Embodiments

In other embodiments, the above principles can be applied to other materials capable of phase change, including nonceramic materials or other chemistries. For example, in any material in which a phase change may be selectively introduced in selective zones of the material, the above principles may be applied to induce the phase change and thus modify the properties of the material either in the selected zones or in the material as a whole. As such, the above principles can be applied to produce materials with desirable properties including but not limited to insulators. For example, in a material capable of a phase change that would alter the density of the material if the material was allowed to expand in volume, the same compressive and tensive forces described above could be introduced into the material by selectively inducing phase changes without allowing appreciable changes in volume. In this way, a material could be strengthened by, for example, preventing the propagation of cracks through the material due the compressive and tensive forces in the material.

Similarly, in other materials the phase change can be used to alter other properties. For example, in a system where the phase change alters the index of refraction, the phase change can be selectively introduced in selective zones to alter the index of refraction in those zones. In this way the index of refraction can be modified in a single material across a crosssection of the material based on the induced phase changes. In another example, if the phase change alters the chemical or corrosive resistance in the material, the corrosive or chemical resistance of selected zones of the material can be modified by selectively inducing a phase change in those selected zones.

In another aspect, flame or heat processing can be used to improve the above or other properties of the material. The flame or heat processing can include the use of a hydrogen torch, inductive or resistive heating, or any other method known in the art, including techniques to target specific locations within the material to select zones for treatment within the material or at the surface of the material by, for example, selecting the particular wavelength of an applied radiation.

The flame or heat processing can be used to process the surface of the material, including to smooth the surface to prevent stress risers that may weaken the material or for other advantages. For example, upon heating, surface tension due to covalent and/or ionic bonds within the material can cause the surface to smooth thus reducing or eliminating stress risers or other defects on the surface of the material.

The flame or heat processing can also be used to induce a phase change in the material for the reasons set forth above. For example, if the material includes boron oxide, a reducing flame may be employed to create a boron rich zone. Then, an oxidizing flame may be employed to oxidize the boron resulting in a more effective nucleating agent and/or to enhance the ability to select the specific zone of the material for nucleation/phase change. This process can be applied to any component of the material susceptible to flame or heat processing, including any metallic compound. Similarly the flame or heat processing could be used to directly modify the material or a zone in the material depending on the specific composition of the material or the zone. The flame or heat treatment can result in more crystal grains as set forth above, and/or improved selection of target zones for treatment, thus further improving material endurance, dielectric strength, and/or other properties. In another aspect, the flame or heat treatment can be employed to prevent nucleation or other changes in the flame or heat treated zone by vaporizing and/or deactivating the nucleate in the selected zone.

In other embodiments other properties can be modified by selectively inducing a phase change. These properties include modifications of surface tension, friction, index of refraction, speed of sound, modulus of elasticity and thermal conductivity.

It will be apparent that various changes and modifications can be made without departing from the scope of the disclosure. For example, the dielectric strength or other properties may be altered or varied to include alternative materials and processing means or may include alternative configurations than those shown and described and still be within the spirit of the disclosure.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number, respectively. When the claims use the word "or" in reference to a list of two or more items, that word covers all of the following interpretations of the word: any of the items in the list, all of the items in the list, and any combination of the items in the list.

The various embodiments described above can be combined to provide further embodiments. All of the U.S. patents, U.S. patent application publications, U.S. patent applications, foreign patents, foreign patent applications and nonpatent publications referred to in this specification and/or listed in the Application Data Sheet are incorporated herein by reference, in their entirety. Aspects of the disclosure can be modified, if necessary, with various configurations, and concepts of the various patents, applications, and publications to provide yet further embodiments of the disclosure.

These and other changes can be made to the disclosure in light of the above-detailed description. In general, in the following claims, the terms used should not be construed to limit the disclosure to the specific embodiments disclosed in the specification and the claims, but should be construed to include all systems and methods that operate in accordance with the claims. Accordingly, the invention is not limited by the disclosure, but instead its scope is to be determined broadly by the following claims.

I claim:

1. An insulator comprising:
   a ceramic composition,
   wherein the ceramic composition comprises crystalline grains and wherein the crystalline grains are substantially oriented to extend in a first direction to provide improved insulating properties in a direction perpendicular to the first direction, wherein the ceramic composition comprises: about 25-60% $SiO_2$;
   15-35% $R_2O_3$, wherein the $R_2O_3$ is 3-15% $B_2O_3$ and 5-25% $Al_2O_3$;
   4-25% MgO+0-7% $Li_2O$, wherein the total of MgO+$Li_2O$ is between about 6-25%;
   2-20% $R_2O$, wherein the $R_2O$ is 0-15% $Na_2O$, 0-15% $K_2O$, 0-15% $Rb_2O$;
   0-15% $Rb_2O$;
   0-20% $Cs_2O$; and
   4-20% F,
   wherein the first direction is circumferential and the direction perpendicular to the first direction is radial.

2. The insulator of claim 1 further comprising a first zone and a second zone wherein the first zone is in compression and the second zone is in tension.

3. The insulator of claim 2 wherein the first zone is adjacent an outer surface of the insulator.

4. The insulator of claim 3 wherein the first zone comprises more crystal grains per volume that the second zone.

5. The insulator of claim 3 wherein the crystal grains of the first zone have a packing efficiency less than the crystal grains of the second zone.

6. The insulator of claim 3 wherein the first zone comprises diffused ions, sputtered surfaces, or a dopant.

7. The insulator of claim 2 wherein the insulator has a dielectric strength of greater than about 1.2 KV/0.001" at a temperature from about −30° C. to 450° C.

8. The insulator of claim 2 wherein the insulator has a dielectric strength of greater than about 1.9 KV/0.001" at a temperature from about −30° C. to 450° C.

9. The insulator of claim 2 wherein the insulator has a dielectric strength of greater than about 2.5 KV/0.001" at a temperature from about −30° C. to 450° C.

10. The insulator of claim 2 wherein the insulator has a dielectric strength of greater than about 3 KV/0.001" at a temperature from about −30° C. to 450° C.

11. A fuel injector-igniter comprising the insulator of claim 2.

12. An insulator comprising:
a ceramic composition, wherein the ceramic composition comprises:
about 25-60% $SiO_2$; 15-35% $R_2O_3$, wherein the $R_2O_3$ is 3-15% $B_2O_3$ and 5-25% $Al_2O_3$; 4-25% MgO+0-7% $Li_2O$, wherein the total of MgO+$Li_2O$ is between about 6-25%; 2-20% $R_2O$, wherein the $R_2O$ is 0-15% $Na_2O$, 0-15% $K_2O$, 0-15% $Rb_2O$; 0-15% $Rb_2O$; 0-20% $Cs_2O$; and 4-20% F;
crystalline grains, wherein the crystalline grains are substantially oriented to extend in a first direction to provide improved insulating properties in a direction perpendicular to the first direction, wherein the first direction is circumferential and the direction perpendicular to the first direction is radial; and
a first zone and a second zone, wherein the first zone is in compression and the second zone is in tension.

* * * * *